United States Patent
Tao et al.

(10) Patent No.: US 10,635,259 B2
(45) Date of Patent: Apr. 28, 2020

(54) LOCATION GLOBE IN VIRTUAL REALITY

(71) Applicant: Google LLC, Mountain View, CA (US)

(72) Inventors: Ran Tao, San Ramon, CA (US); Tarik Abdel-Gawad, Mountain View, CA (US); Adam Glazier, Oakland, CA (US); Dominik Philemon Kaeser, Mountain View, CA (US); Matthew Seegmiller, Mountain View, CA (US); Andre Le, Mountain View, CA (US); Nadav Ashkenazi, Mountain View, CA (US); Han-Wei Chu, Mountain View, CA (US); Joanna Kim, Mountain View, CA (US); Michael Podwal, San Francisco, CA (US); Robert Carl Jagnow, Mountain View, CA (US); Chun-Po Wang, Union City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/814,103

(22) Filed: Nov. 15, 2017

(65) Prior Publication Data

US 2018/0136816 A1 May 17, 2018

Related U.S. Application Data

(60) Provisional application No. 62/422,563, filed on Nov. 15, 2016.

(51) Int. Cl.
*G09G 5/00* (2006.01)
*G06F 3/0481* (2013.01)
(Continued)

(52) U.S. Cl.
CPC ....... *G06F 3/04815* (2013.01); *G02B 27/017* (2013.01); *G06F 3/011* (2013.01);
(Continued)

(58) Field of Classification Search
CPC .......... G06F 3/0482; G06F 3/013; G06F 8/65; G06F 3/147; G06F 3/011; G06F 3/04842;
(Continued)

(56) References Cited

U.S. PATENT DOCUMENTS 9,766,713 B2 * 9/2017 West ........................ G06F 3/017
9,767,613 B1 * 9/2017 Bedikian ............... G06T 19/006
(Continued)

OTHER PUBLICATIONS

International Search Report and Written Opinion for International Application No. PCT/US2017/061816, dated Mar. 22, 2018, 12 pages.
(Continued)

*Primary Examiner* — Duc Q Dinh
(74) *Attorney, Agent, or Firm* — Brake Hughes Bellermann LLP

(57) ABSTRACT

In one general aspect, a method can include triggering display of a virtual environment in a head mounted display (HMD) device operating in a physical environment, triggering display of a first virtual object representing a second virtual object, the first virtual object having a size smaller than a size of the second virtual object, receiving an indication of an interaction of a user with the first virtual object, the user having a first size larger than the size of the first virtual object, and triggering an interaction with the second virtual object in response to an interaction with the first virtual object, the user having a second size larger than the first size when interacting with the second virtual object.

21 Claims, 17 Drawing Sheets

(51) Int. Cl.
*G02B 27/01* (2006.01)
*G06F 3/01* (2006.01)
*G06F 3/033* (2013.01)
*G06T 19/00* (2011.01)
*G06F 3/0484* (2013.01)
*G06T 19/20* (2011.01)

(52) U.S. Cl.
CPC .............. *G06F 3/012* (2013.01); *G06F 3/033* (2013.01); *G06T 19/003* (2013.01); *G02B 2027/014* (2013.01); *G02B 2027/0187* (2013.01); *G06F 3/04842* (2013.01); *G06T 19/20* (2013.01); *G06T 2200/24* (2013.01); *G06T 2219/2016* (2013.01)

(58) Field of Classification Search
CPC ........ G06F 16/29; G06F 3/0346; G06F 3/048; G06F 3/04815; G06F 1/163; G06F 2203/04806; G06F 3/012; G06F 3/017; G06F 3/033; G06F 3/041; H04W 4/046; H04W 84/005; H04W 36/32; H04W 4/21; H04W 4/70; H04W 4/021; H04W 4/04; H04W 4/02; H04W 92/18
USPC .......................................................... 345/7–9
See application file for complete search history.

(56) References Cited

U.S. PATENT DOCUMENTS

2008/0288893 A1 11/2008 Nikkels et al.
2014/0266988 A1 9/2014 Fisher et al.

OTHER PUBLICATIONS

Pfeiffer, "Classic 3D User Interaction Techniques for Immersive Virtual Reality Revisited", retrieved on Feb. 14, 2017 from htttps://www.youtube.com/watch?v=KaNE4946LDk, Jan. 25, 2010, 2 pages.
International Preliminary Report on Patentability for International Application No. PCT/US2017/061816, dated Feb. 13, 2019, 13 pages.

* cited by examiner

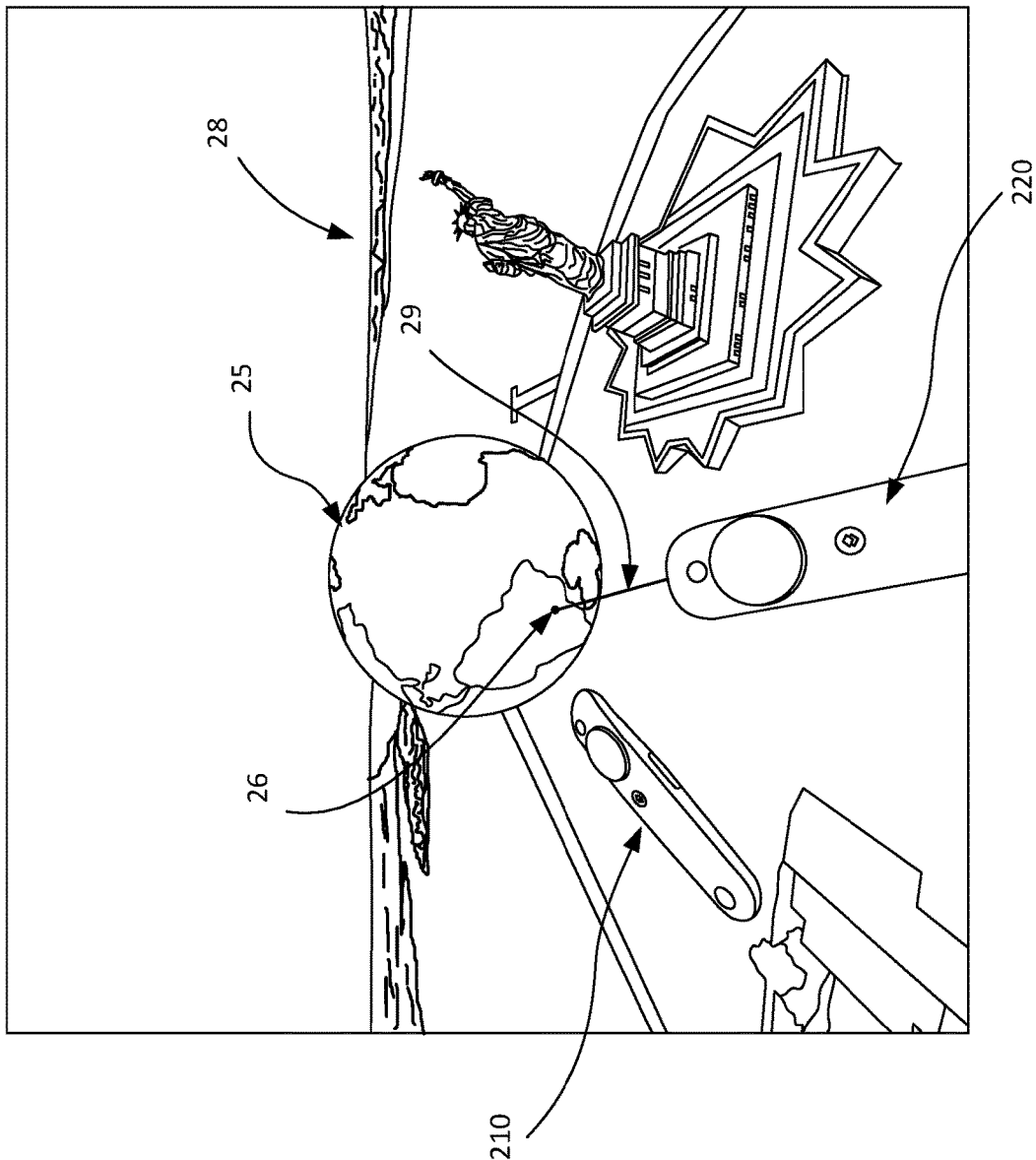

US 10,635,259 B2

LOCATION GLOBE IN VIRTUAL REALITY

RELATED APPLICATION

This application claims the priority benefit of U.S. Provisional Patent Application No. 62/422,563, filed on Nov. 15, 2016, and entitled "LOCATION GLOBE IN VIRTUAL REALITY," the entirety of which is incorporated herein by reference.

FIELD

This disclosure relates, generally, to a location globe in a virtual reality or augmented reality environment.

BACKGROUND

An augmented reality (AR) and/or virtual reality (VR) system may generate an immersive, three-dimensional (3D) virtual environment. A user may interact with virtual objects, elements, features and the like in this virtual environment using various electronic devices, such as, for example, a helmet or other head mounted device including a display, glasses or goggles that a user looks through when viewing a display device, one or more external electronic devices such as controllers, joysticks and the like, gloves fitted with sensors, keyboards, mouse, and other electronic devices. While immersed in the virtual environment, the user may move through the virtual environment, and may manipulate and interact with virtual elements of the virtual environment through, for example, physical movement, and/or manipulation of one or more electronic devices.

SUMMARY

In one general aspect, a method can include triggering display of a virtual environment in a head mounted display (HMD) device operating in a physical environment, triggering display of a first virtual object representing a second virtual object, the first virtual object having a size smaller than a size of the second virtual object, receiving an indication of an interaction of a user with the first virtual object, the user having a first size larger than the size of the first virtual object, and triggering an interaction with the second virtual object in response to an interaction with the first virtual object, the user having a second size larger than the first size when interacting with the second virtual object.

In another general aspect, a method may include triggering display of a virtual environment in a head mounted display (HMD) device operating in a physical environment, triggering display of a first virtual object associated with a first controller, the first virtual object being a representation of a second virtual object, the first virtual object having a size smaller than a size of the second virtual object, selecting a location within the first virtual object, via a second controller, to trigger movement of a user to a location in the second virtual object, and receiving an indication of a interaction within the second virtual object.

In another general aspect, an apparatus including a head mounted display (HMD) device, a first controller and a second controller, and a processor programmed to: generate a virtual environment, display a first virtual object, via the first controller, representing a second virtual object, the first virtual object having a size scaled down relative to a size of the second virtual object, select a location within the first virtual object, via the second controller, to move a user to a location in the second virtual object, and interact within the second virtual object.

The details of one or more implementations are set forth in the accompanying drawings and the description below. Other features will be apparent from the description and drawings, and from the claims.

BRIEF DESCRIPTION OF THE DRAWINGS

FIG. 2 illustrates a virtual environment viewed by a user using a first controller and a second controller.

DETAILED DESCRIPTION

A user immersed in an augmented reality (AR) and/or a virtual reality (VR) environment wearing, for example, a head mounted display (HMD) device may explore the virtual environment and interact with virtual objects, features and the like in the virtual environment through various different types of inputs. These inputs may include, for example, physical interaction including, for example, physical movement and/or manipulation or the HMD and/or of an electronic device separate from the HMD, and/or hand/arm gestures, head movement and/or head and/or eye directional gaze and the like. A user may implement one or more of these different types of interactions to execute a particular action in the virtual environment, such as, for example, moving through the virtual environment, for example, from a first area of the virtual environment to a second area of the virtual environment, or from a first virtual environment to a second virtual environment.

A system and method, in accordance with implementations described herein, may allow the user to navigate within a virtual reality or augmented reality environment. Specifically, a first object within the virtual or augmented environment can be used to navigate within a second object within the virtual or augmented environment. The first object can be a smaller scale (e.g., a miniaturized) version of at least a portion of the second object. The second object, because it can be relatively large compared with the first object, may be difficult to directly navigate within the virtual or augmented reality environment. The first object, because of its relatively small size, may be a much easier object with which the user can interact to navigate within the second object. In some implementations, the first object can be a mini-globe (also can be referred to as a location globe) of Earth that can be used to navigate within the second object which can be a larger representation of the entire Earth.

Figure 1A:
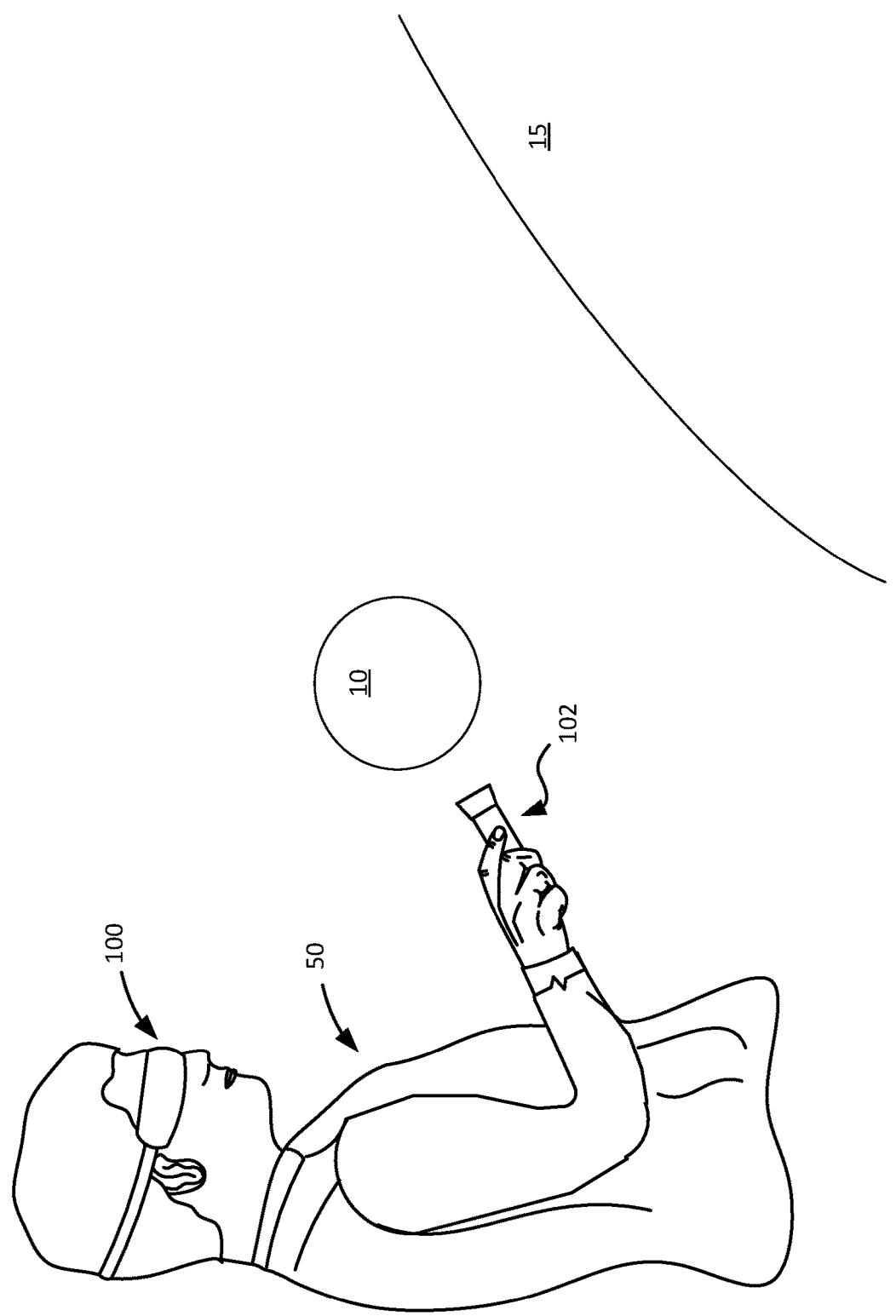
FIGS. 1A-1C illustrate a third person view of example implementations of an augmented reality and/or a virtual reality system including a head mounted display device and one or more handheld electronic devices, in accordance with implementations as described herein.
Figure 1B:
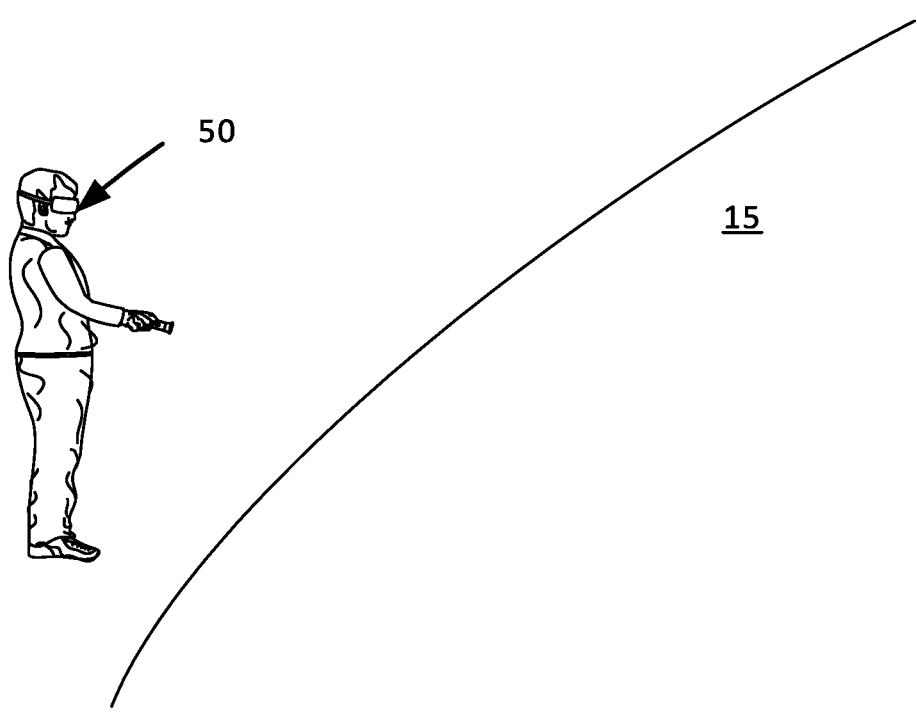
Figure 1C:
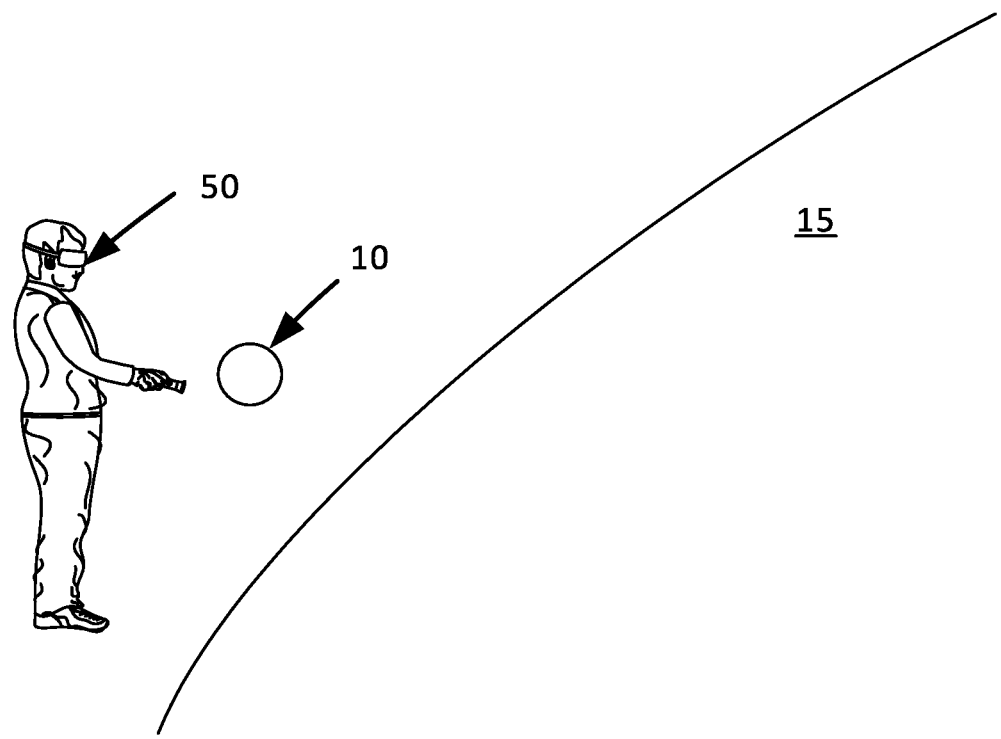

In the example implementation shown in FIGS. 1A-1C, a user wearing an HMD 100 is holding a portable handheld electronic device 102. The handheld electronic device 102 may be, for example, a controller, a smartphone, a joystick, or another portable handheld electronic device(s) that may be paired with, and communicate with, the HMD 100 for interaction in the virtual reality or augmented reality environment generated by the HMD 100 and displayed to the user, for example, on a display of the HMD 100. The handheld electronic device 102 can be used to function as a controller in communication with the HMD 100 for interacting in the immersive virtual reality or augmented reality environment generated by the HMD 100.

As shown in FIG. 1A, a first object 10 and a second object 15 can be viewed via the HMD 100 in a virtual environment. The user 50 wearing the HMD 100, the handheld electronic device 102, the first object 10 and the second object 15 are shown from a third person point of view in FIG. 1A for description purposes. Specifically, the first object 10 and the second object 15 will be visible by the user wearing the HMD 100 and are shown in this FIG. 1A so that interactions of the user with the first object 10 and the second object 15 can be more easily illustrated and described.

In this implementation, the first object 10 can be used to navigate within a second object 15. The first object 10 can be a smaller scale (e.g., a miniaturized) version of at least a portion of the second object 15. The first object 10 can be much smaller (e.g., 10 times smaller, 100 times smaller, etc.) than the second object 15. The second object 15, because it is relatively large compared with the first object 10, may be difficult to directly interact with or navigate within. The first object 10, because it is relatively small, may be much easier object with which the user can interact. As a specific example, the first object 10 can be a mini representation (e.g., globe) of the Earth (or another planet) that can be used to navigate with the second object 15 which can be a larger representation of Earth (or another planet).

In relation with respect to the user 50, the first object 10 may be smaller than a size of the user, as shown in FIG. 1A. For example, the first object 10 can be 10 times smaller than the user 50 (and outside of the first object 10). This helps the user 50 to navigate (e.g., make a location selection) within the first object 10, since the user 50 is larger than the first object 10.

In some implementations, a surface of the second object 15 can correspond with a surface (albeit scaled in size) of the first object 10. In some implementations, interactions with the first object 10 can be translated into interactions with the second object 15. In some implementations, interactions with the first object 10 can be translated directly into corresponding interactions with the second object 15. In this implementation, the second object 15 may be identical with the first object 10. For example, interactions with the first object 10 (e.g., selecting New York city location) will directly translate the user to a location (e.g., New York city) in the second object 15.

In some implementations, interactions with the first object 10 can be used to guide later interactions with the second object 15. For example, when the user 50 selects a location (e.g., New York city) within the first object 10, the user 50 may interact within the second object 10 at a later predetermined of time (while interacting within the second object 10 at a different location). In some implementations, the selected location (e.g., New York city) may be identified with an indicator (or some form of marker) to interact within the selected location at a later time.

In some implementations, interactions with the first object 10 can be a first level of interactions that can be later followed with a second level of interactions with the second object 15. For example, the first level of interactions may be interactions associated with the first object 10. That is, the user 50 interacts with the first object 10 to select a location on the first object 10. In this (first) level of interactions, the user 50 has a large scale (e.g., larger than the first object 10) to navigate within the first object 10, as shown in FIG. 1A. Once the interactions at the first level is performed, the second level of interactions, which is associated with the second object 15, may then be performed. In this (second) level of interactions, the user 50 has a smaller scale (as compared to the user 50 when performing the first level of interactions) so that the user 50 may interact with the second object 15, as shown in FIG. 1B or 1C. For example, the user 50 may be on or near a surface of the second object 15. In another example, the user 50 may be within the second object 15, and be completely immersed in an environment of the second object 15.

In some implementations, interactions (e.g., first level interactions) with the first object 10 can be at a first selection level and a second selection level. For example, the first selection level of interactions can be a general location on the first object (e.g., location near Europe—e.g., Germany and Italy) and the second selection level of interactions can be a more specific location on the first object 10 (e.g., cities in Italy—e.g., Milan and Florence). In some implementations, there may be more than two selection levels of interactions. These interactions can provide a greater accuracy and precision as used to navigate within the second object 10.

In some implementations, the first object 10 can be associated with the handheld electronic device 102 (which can be referred to as a controller), another controller (not shown), and/or another location and/or feature within a virtual environment. In some implementations, the first object 10 can be configured to move in response to movements with the controller 102 as if the first object 10 is rigidly connected with the controller 102. For example, if the controller 102 moves to the left or right, the first object 10 moves to the left or right; and if the controller 102 moves up or down, the first object 10 moves up or down. Other directions may be employed besides the ones described herein. In some implementations, when the controller 102 moves the first object 10, the second object 15 may trigger a corresponding movement of the first object 10. In other implementations, when the controller 102 moves the first object 10, the second object 15 may not trigger a corresponding movement of the first object 10, and provide a view to the user that is stationary.

In some implementations, the first object 10 can be configured to be positioned (e.g., float) at a certain distance distal from (e.g., proximal to) a portion of the controller 102. For example, the first object 10 can be disposed directly in front of the controller 102. In other examples, the first object 10 can be above the controller 102. Other locations of the first object 10 in relation to the controller 102 may be implemented in addition to or in lieu of the ones described herein. The first object 10 may be relatively close to the controller 102 since it may be easier to interact (e.g., navigate, manipulate, select, etc.) with the first object 10.

In some implementations, as shown from a third person point of view in FIG. 1A, the user may be in front of the first object 10 for interactions. In other words, the first object 10 may be disposed between the user 50 and the second object 15. In some implementations, as shown from a third person point of view in FIG. 1B, the user (smaller scale) 50 is in front of the second object 15 for interactions. In this example, the first object 10 may be irrelevant (e.g., not visible by the user) for interactions. In some implementations, the first object 10 may be invisible or removed entirely. In some implementations, as shown from a third person point of view in FIG. 1C, the first object 10 may be disposed between the user 50 and the second object 15. In this example, while the user (smaller scale) 50 is interacting with the second object 15, the user 100 may interact with the first object 10 to select another location on the first object 10. Further, in this example, the first object 10 may be smaller than the user 50 (and smaller than in FIG. 1A when the user was a large size).

In some implementations, the first object 10 can be configured to change state in response to interactions using the controller 102. For example, the first object 10 can be configured to expand in size, contract in size, rotate, disappear, change color or shape, and/or so forth. As a specific example, a beam from the controller 102 intersecting with the first object 10 can cause the first object 10 to expand and/or contract. For example, the first virtual object 10 may be expanded (e.g., size enlarged) when responding to selecting the location, and conversely, the first virtual object may be contracted (e.g., size reduced) when no location is selected by the controller 102.

Figure 1D:
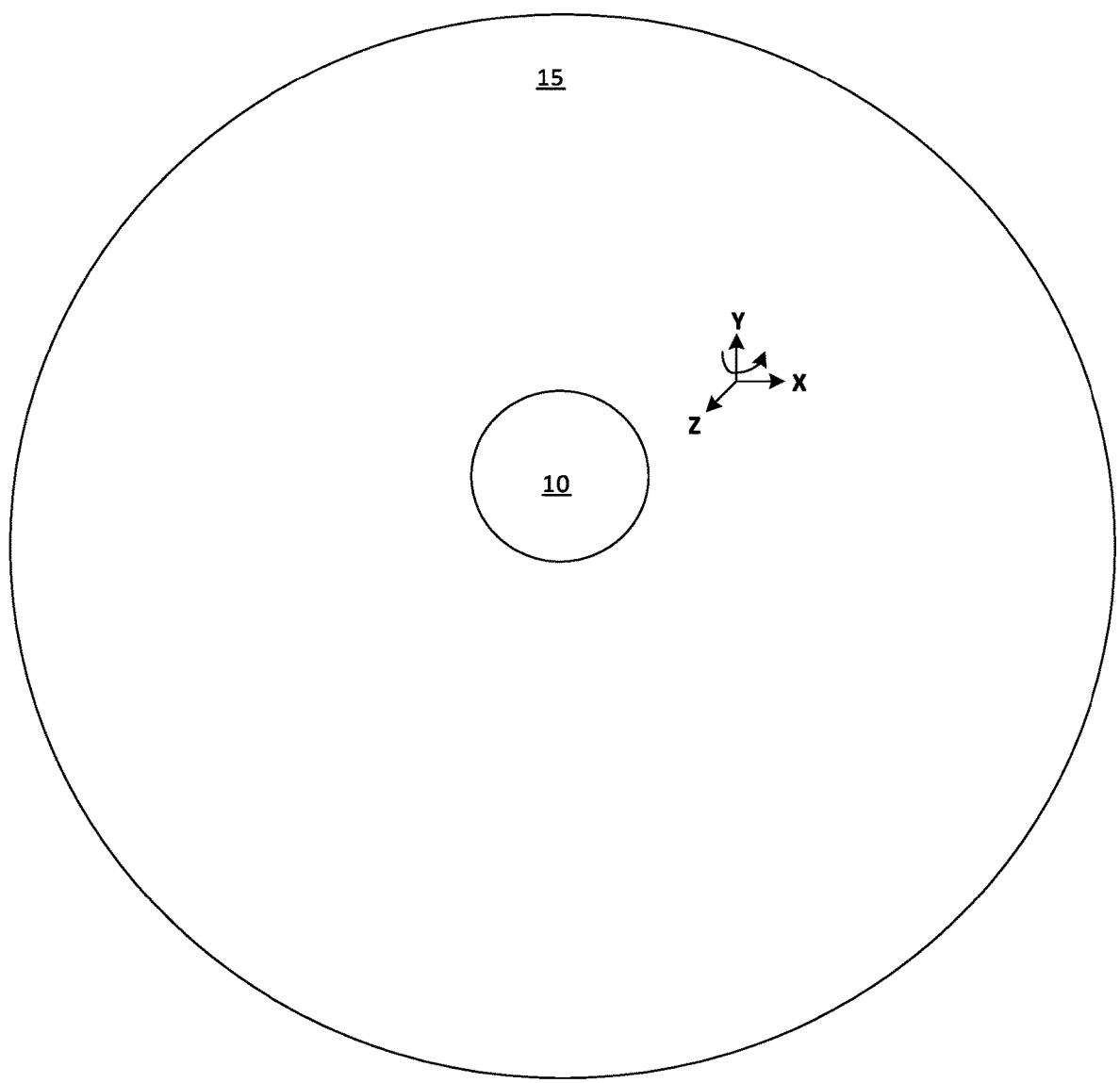
FIG. 1D illustrates a first virtual object in relation to a second virtual object.

As shown in FIG. 1D, which illustrates the first object 10 and the second object 15 simultaneously viewed by the user, the first object 10 is much smaller than the second object 15. In some implementations, the interactions with the first object 10 may not immediately be translated to the second object 15. For example, the user may interact with the first object 10 (e.g., interact in 6 degrees of freedom (DoF), or interact in 3 DoF) by moving the controller (not shown) to the left or the right, or in the ±X direction (or manipulating another control mechanism of the controller in a similar manner), up or down, or in the ±Y direction by moving the controller up or down, or in the ±Y direction (or manipulating another control mechanism of the controller in a similar manner), and in a forward and/or backward direction, or in a ±Z direction, by moving the controller in a forward and/or backward direction, or in the ±Z direction (or manipulating another control mechanism of the handheld electronic device 102 in a similar manner). The interactions of the first object 10 is performed prior to the interactions with the second object 15. In some implementations, the first object 10 may be rotated along in the Y-direction axis, to rotate the first object 10 to a desired location. In this example, the rotation of the first object 10 can be counterclockwise.

In some implementations, an interaction with the first object 10 can be used to move to (e.g., teleport to) a location on the second object 15. For example, a location on the first object 10, which can be a scaled down version of the second object 15, can be selected using the handheld electronic device 102. In response to the selection of the location of the first object 10, a virtual experience of the user can be moved to a location of the second object 15. Location on the second object 15 can correspond to the location of the first object 10. Accordingly, interaction associated with the second object 15 can be triggered via interaction with the first object 10.

Although not illustrated in FIG. 1, interaction with the first object 10 can be implemented using more than one controller. Specifically, a second controller can be used in addition to the controller 102 shown in FIG. one to interact with the first object. Such an implementation is illustrated in at least FIG. 2.

FIG. 2 illustrates a virtual environment viewed by a user using a first controller 210 and a second controller 220. The first and second controllers 210, 220 (which can be shown in the virtual environment) can be controlled by a user viewing the virtual environment. The first controller 210 (also can be referred to as a primary controller) and the second controller 220 are configured to interact with a globe 25 (e.g., a first object, a mini-globe) so that a virtual experience of a user with respect to the Earth 28 (e.g., a second object) can be modified. Although FIG. 2 is discussed in the context of the globe 25 (which is a scaled version of at least a portion of the Earth) and the Earth 28, the description associated with FIG. 2 can be applied to a variety of first and second objects.

In some implementations, the first controller 210 and the second controller 220 can be configured to trigger different operations or actions or can have different (or overlapping) functions. For example, the first controller 210 can be used to rotate the globe 25 and the second controller can be used to identify a location on the globe 25 for teleporting (which can correspond with a location on the Earth 28). In some implementations, the globe 25 can be associated with the first controller 210. Specifically, the globe 25 can be configured to move with the first controller 210 as if the globe 25 is rigidly coupled to the first controller 210 or is an extension of the first controller 210. Accordingly, when the first controller 210 is moved by a user, the globe 25 can move in a corresponding fashion with the first controller 210. For example, if the first controller 210 moves to the left or right, the globe 25 moves to the left or right; and if the first controller 210 moves up or down, the globe 25 moves up or down. Other directions may be employed besides the ones described herein.

In this implementation, a user (not shown) can point at a location 26 on the globe 25 using the second controller 220. For example, the user may direct a beam 29 emitting from the second controller 220 to identify the location 26 on the globe 25. In some implementations, the location 26 can be identified using a marker of some type on the globe 25. In response to interacting with the second controller 220 (e.g., pulling a trigger or clicking a button on the second controller 220), the virtual environment of the user can be moved (e.g., teleported, transported, transferred, etc.) to the location within the Earth 28 that corresponds with the location on the globe 25.

Figure 3:
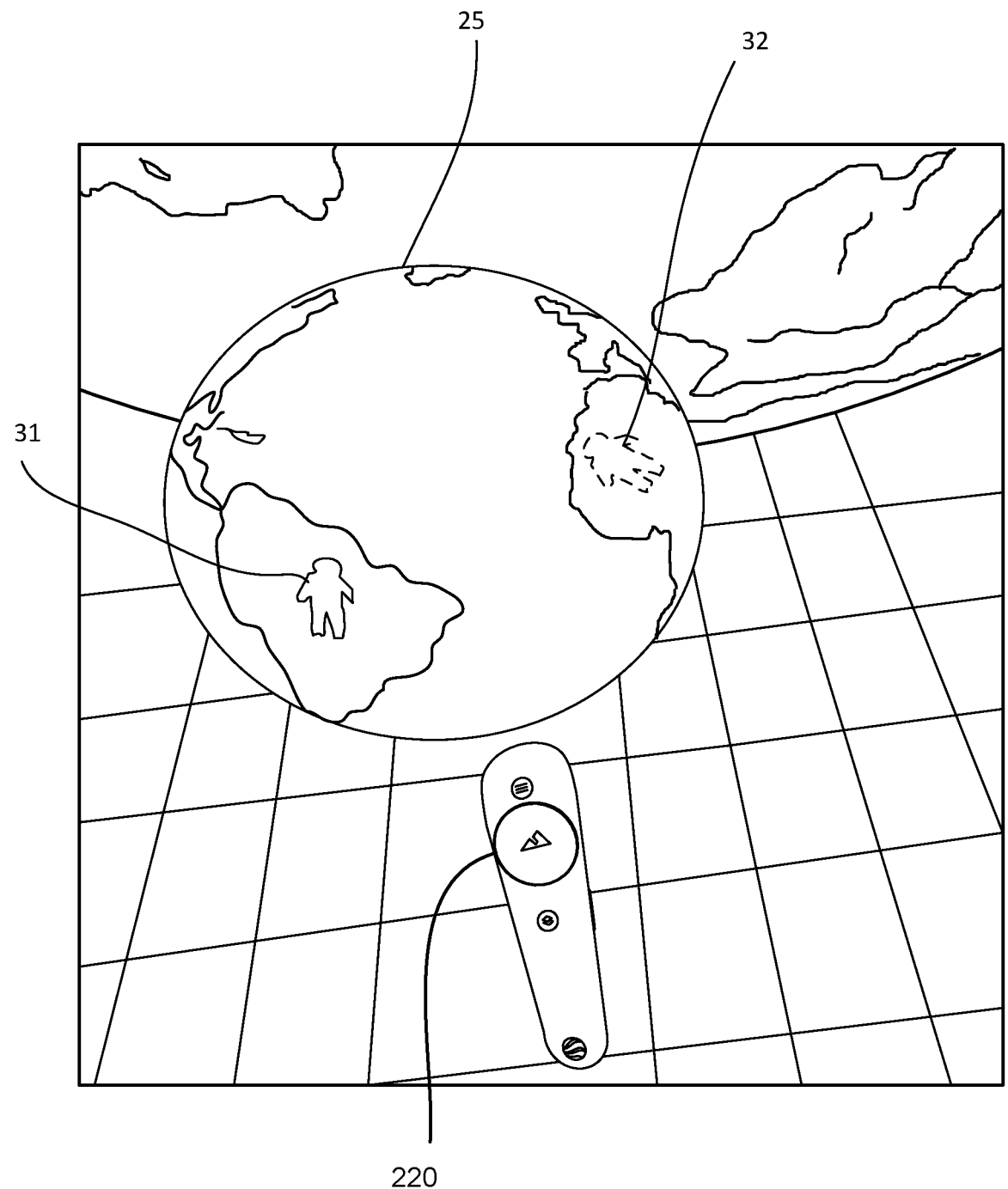
FIG. 3 illustrates an example of using indicators associated with a globe.

In some implementations, an indicator (e.g., a cursor pin, a small person, an astronaut) can hover a location on the globe 25 based on an interaction of the second controller 220 with the globe 25. Specifically, an indicator can be included at a location of an intersection of the beam 29 with a surface of the globe 25. Another example of an indicator associated with a globe 25 is illustrated in FIG. 3. In this implementation in FIG. 3, an astronaut 31 instead of an indicator (e.g., a location pin) is shown when the user is in space, and a ghost astronaut 32 instead of an indicator is illustrated to represent to a user that the user will transition to space mode. In this example, the astronaut 31 may represent an indicator that indicates a desired location of the user associated with the globe 25, and the ghost astronaut 32 may represent an indicator that may hover around the globe 25 indicating a current location based on the interaction of the second controller 220. For example, the user may select a location on the globe 25 and indicate the location by marking the location with the astronaut 31 while the astronaut 32 hovers around the globe 25 indicating a current location based on the interaction of the second controller 220.

In some implementations, an indicator can be used to facilitate orientation of the user with respect to the globe 25 and/or the Earth 28. For example, in some implementations, a compass can be used by the user to orientate themselves within the globe 25 and/or the Earth 28. In some implementations, instead of a pin indicating the location of the user, an arrow or field of view object can rotate to mimic the current head direction of the user within in the globe 25 and/or the Earth 28.

In some implementations, after pointing to the location 26 on the globe 25, a user can trigger movement (e.g., teleporting, transition) directly to a location on the Earth 28 that corresponds with the location 26. In some implementations, the triggering of the transition can be in response to pulling a trigger of a controller (e.g., of the second controller 220).

In some implementations, after pointing to the location 26 on the globe 25, a user can trigger the screen to fade and transition to the user to hover (e.g., hover far above, hover to a space mode (in outer space) above) the location on the Earth 28 that corresponds with the location 26. In some implementations, the triggering to fade can be in response to pulling a trigger of a controller (e.g., of the second controller 220).

In some implementations, when in a terrain view (closer to ground level) within the globe 25 and/or Earth 28, an indicator (e.g., a pin) on the location of the globe 25 and/or Earth 28 can have an arrow that indicates a direction of a head of the user is facing. For example, when in a planet view (further from ground level), the arrow can face up (towards the North pole) when the user is looking at the center of the planet, and turn clockwise when the user turns to the right, and counter-clockwise when the user turns to the left.

In some implementations, when a user directs a beam (e.g., directs for a specified period of time) from a controller (e.g., the second controller 220) at the location 26 of the globe 25, the globe 25 can be modified (e.g., expand) above a controller (e.g., the first controller 210). In other words, the globe 25 can be configured to expand to the size shown in FIG. 2 in response to an interaction (e.g., a hover, an interaction of a beam 29) with the globe 25 by the second controller 220. In some implementations, when the controller is not interacting directly with the globe 25, the globe 25 can contract in size (not shown) from that shown in FIG. 2. In some implementations, directing a beam at the globe 25 for a specified or threshold period of time can be referred to as a hover or as a hover interaction.

In some implementations, when a user directs a beam (e.g., directs for a specified period of time) from a controller (e.g., the second controller 220) at the location 26 of the globe 25, a texture of the globe 25 can crossfades from a vector image to a more detailed image (e.g., a satellite image, an image of country borders). In some implementations, when a user directs a beam (e.g., directs for a specified period of time) from a controller (e.g., the second controller 220) at the location 26 of the globe 25, an indicator can appear on the globe 25 at the point of where the beam intersects the globe 25. In some implementations, when a user directs a beam (e.g., directs for a specified period of time) from a controller (e.g., the second controller 220) at the location 26 of the globe 25, one or more tooltips (e.g., "rotate" associated with a touchpad of first controller 210, "teleport" associated with a trigger of the second controller 220) can be triggered for display.

In some implementations, in response to a user actuating a right rotate button of the first controller 210, for example, the globe 25 can be caused to rotate around the North pole in a counter-clockwise (such that the front face moves to the right). In some implementations, the opposite can be true when the user actuates a left rotate button of the first controller 210. In some implementations, an indicator of a location can follow the rotation of the globe 25 so that it remains at the location of the user.

In some implementations, when a user actuates, for example, a trigger of the second controller 220 while the beam 29 intersects the globe 25, an indicator (e.g., a red pin) can be inserted into the globe 25 (e.g., inserted into the globe by ~20%) at the location of intersection. In some implementations, when a user actuates, for example, a trigger of the second controller 220, an indicator (e.g., a red pin) can remain at a location (e.g., the location 26) when the user actuates the trigger and ceases following a beam intersection with the globe 25. In some implementations, the indicator can be removed when the user's beam from the second controller 220 is no longer intersecting the globe 25 even though the trigger is still being actuated.

In some implementations, when a user releases, for example, a trigger of the second controller 220 while a beam (e.g., the beam 29) is intersecting the globe 25, a display can fade-in to black and fade-out to a planet view above the desired location of the Earth 28. In some implementations, when a user releases, for example, a trigger of the second controller 220 while a beam (e.g., the beam 29) is intersecting the globe 25, an indicator of the location 26 can disappear during fading.

In some implementations, when a user actuates, for example, a trigger of the second controller 220, a first indicator (e.g., a red pin) can be inserted into the globe 25 at a location of a beam intersecting the globe 25. When a user releases, for example, the trigger of the second controller 220 while the beam (e.g., the beam 29) is intersecting the globe 25, a second indicator of a location (e.g., a blue location pin) can move into the position of first indicator. In some implementations, the location on the globe 25 can rotate so that the second indicator of the location pin is now back to a default position at a front of the second controller 220.

In some implementations, when a user releases, for example, a trigger of a controller (e.g., the second controller 220) while the beam is not intersecting the globe 25, the user will not be moved (e.g., teleported) within the Earth 28. In some implementations, the globe 25 may remain in an expanded state for a specified duration and then contract (e.g., shrink). In some implementations, if the globe 25 was rotated, the globe 25 will snap to a default rotation while contracting (e.g., shrinking).

Figure 4:
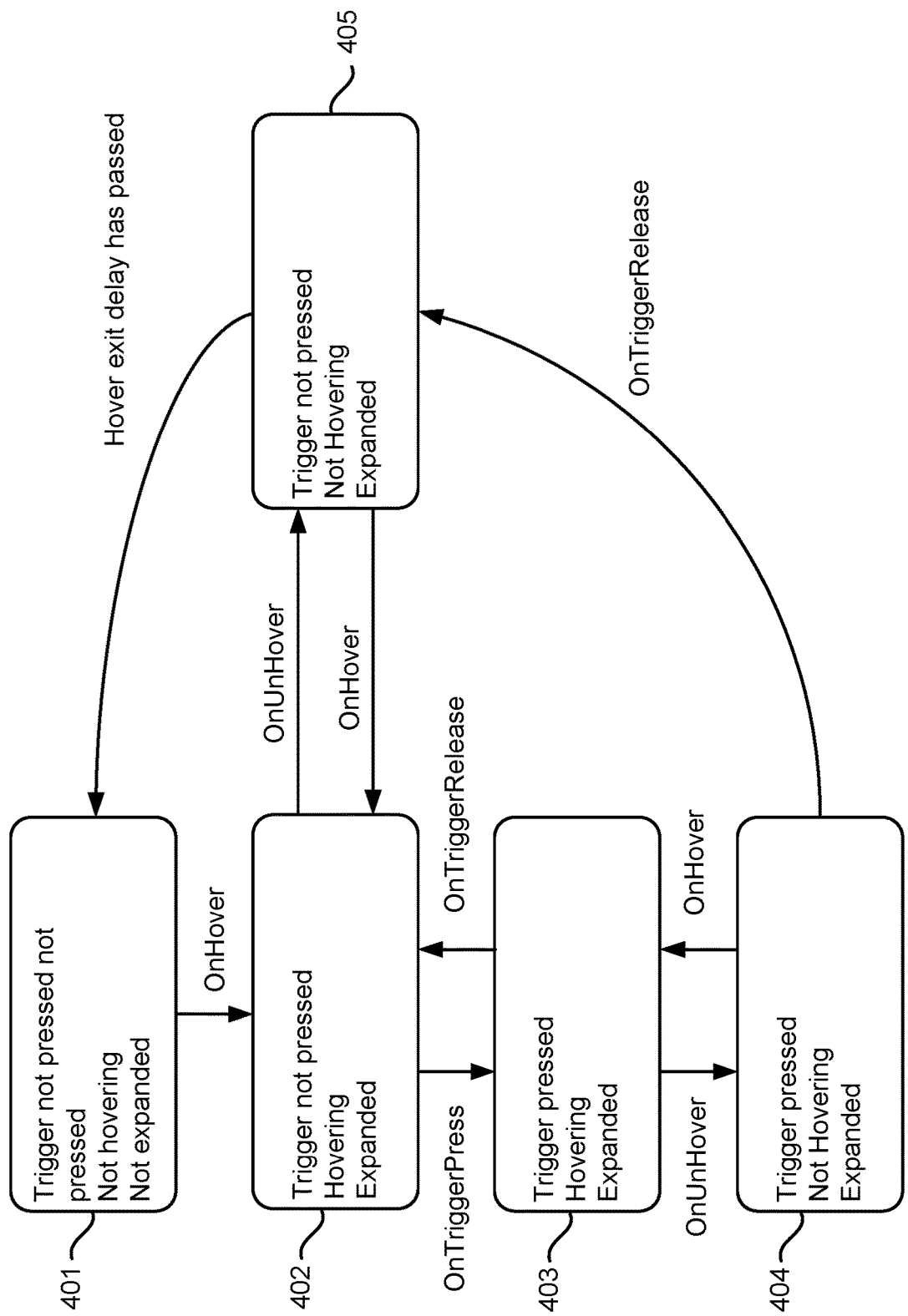
FIG. 4 is a state diagram that illustrates hover and trigger interactions.

FIG. 4 is a state diagram that illustrates hover and trigger interactions. As illustrated in this state diagram, a first object (e.g., globe) can be expanded or contracted based on a variety of combinations of hover and/or trigger interactions. In order for the first object (e.g., globe) to be expanded or contracted, the user may control (e.g., operate) the controller (e.g., the second controller 220). For example, as shown in step 402, the first object (e.g., globe) may be in the expanded state when an indicator (e.g., astronaut) hovers above a location on the first object (e.g., globe) based on an interaction of the controller (e.g., the second controller 220). In another example, as shown in step 403, the first object (e.g., globe) may be in an expanded state when a trigger (e.g., pulling a trigger or clicking a button) is performed on the controller and an indicator (e.g., astronaut) hovers above a location on the first object (e.g., globe) based on an interaction of the controller (e.g., the second controller 220). In another example, as shown in step 404, the first object (e.g., globe) may be in an expanded state when a trigger (e.g., pulling a trigger or clicking a button) is performed on the controller. Step 401 illustrates the first object (e.g., globe) in the contracted state when the trigger is not performed and an indicator (e.g., astronaut) does not hover above a location above the first object (e.g., globe). However, in some implementations, there may be an occasion when the first object (e.g., globe) may be in an expanded state even when the trigger is not performed and an indicator does not hover above a location above the first object (e.g., globe). For example, the first object (e.g., globe) may be in the expanded state when the user releases the trigger on the controller and a delay (predetermined of time has passed) of the indicator (e.g., astronaut) to disappear (e.g., fade, expire, etc.). In other words, the first object (e.g., globe) is in the expanded stated until the time delay has expired.

Figure 5A:
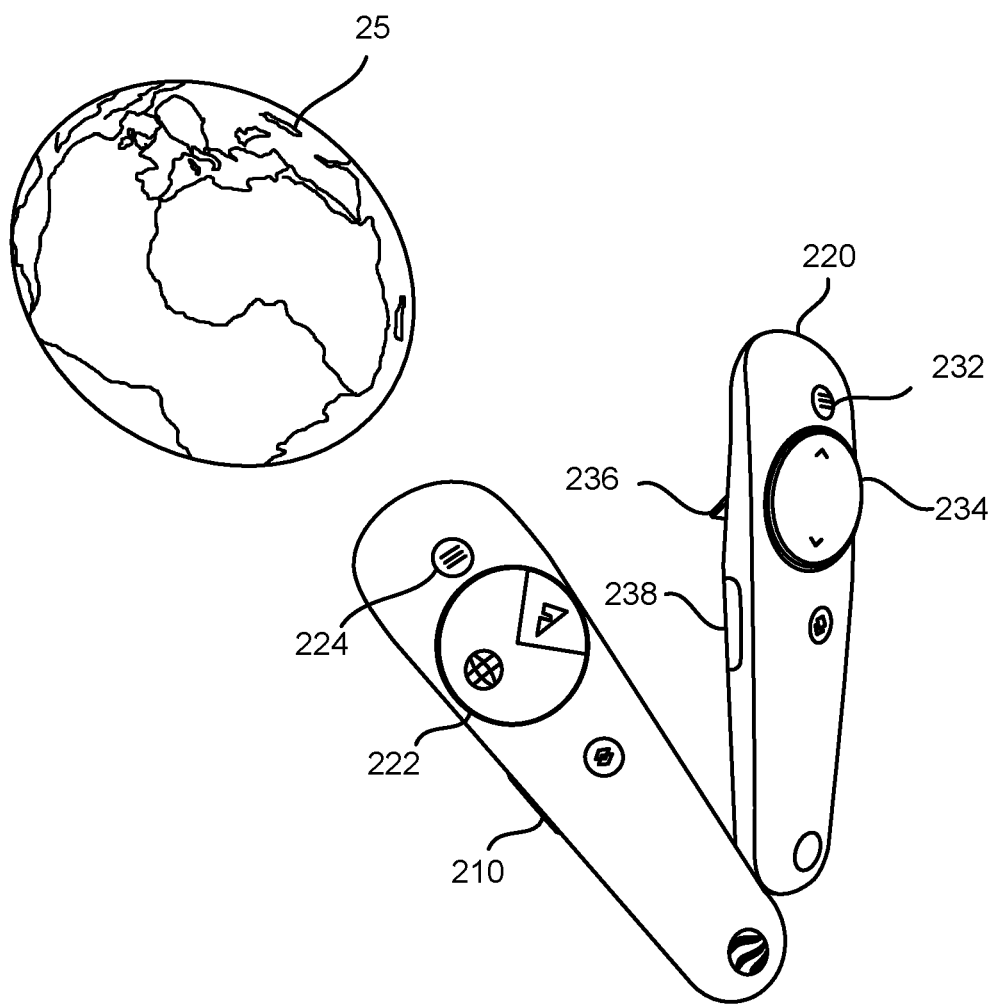
FIG. 5A is a diagram that illustrates additional interactions that can be triggered by controllers.

FIG. 5A is a diagram that illustrates additional interactions that can be triggered by a first controller 210 and a second controller 220. As shown in FIG. 5A, the first object (e.g., globe 25) is in a contracted state. In order to determine a location on the globe 25 to interact (e.g., visit), the user rotates, via the first controller 210, the globe 25 to observe various locations of the globe 25. In some implementations, the first controller 210 includes several buttons and/or triggers for various functions. For example, button/trigger 222 is a globe 25 orientation button (e.g., tilt up Earth) to determine the orientation of the globe 25, and button/trigger 224 has a save function to save visited location(s) (e.g., hold to save).

In order for the globe 25 to expand (enlarge), the user points the second controller 220 at a location on the globe 25 to indicate (via e.g., a cursor pin, a small person, or an astronaut) a location to be moved (e.g., teleport). A beam (not shown) emitting from the second controller 220 may intersect a surface of the globe 25 (and highlighted) to determine the location to visit. Once a location is determined on the globe 25, the user operates one of the buttons and/or triggers on the second controller 220 to teleport to the desired location. In some implementations, the second controller 220 includes several buttons and/or triggers for various functions. For example, button/trigger 232 has a menu function to provide the user a menu window to direct the user to a saved location(s), button/trigger 234 has a fly function to permit the user to fly across the globe 25 and provide directions, button/trigger 236 has a function to drag so that the user can drag a view, and button/trigger 238 has a rotate function to rotate the view as seen by the user.

Figure 5B:
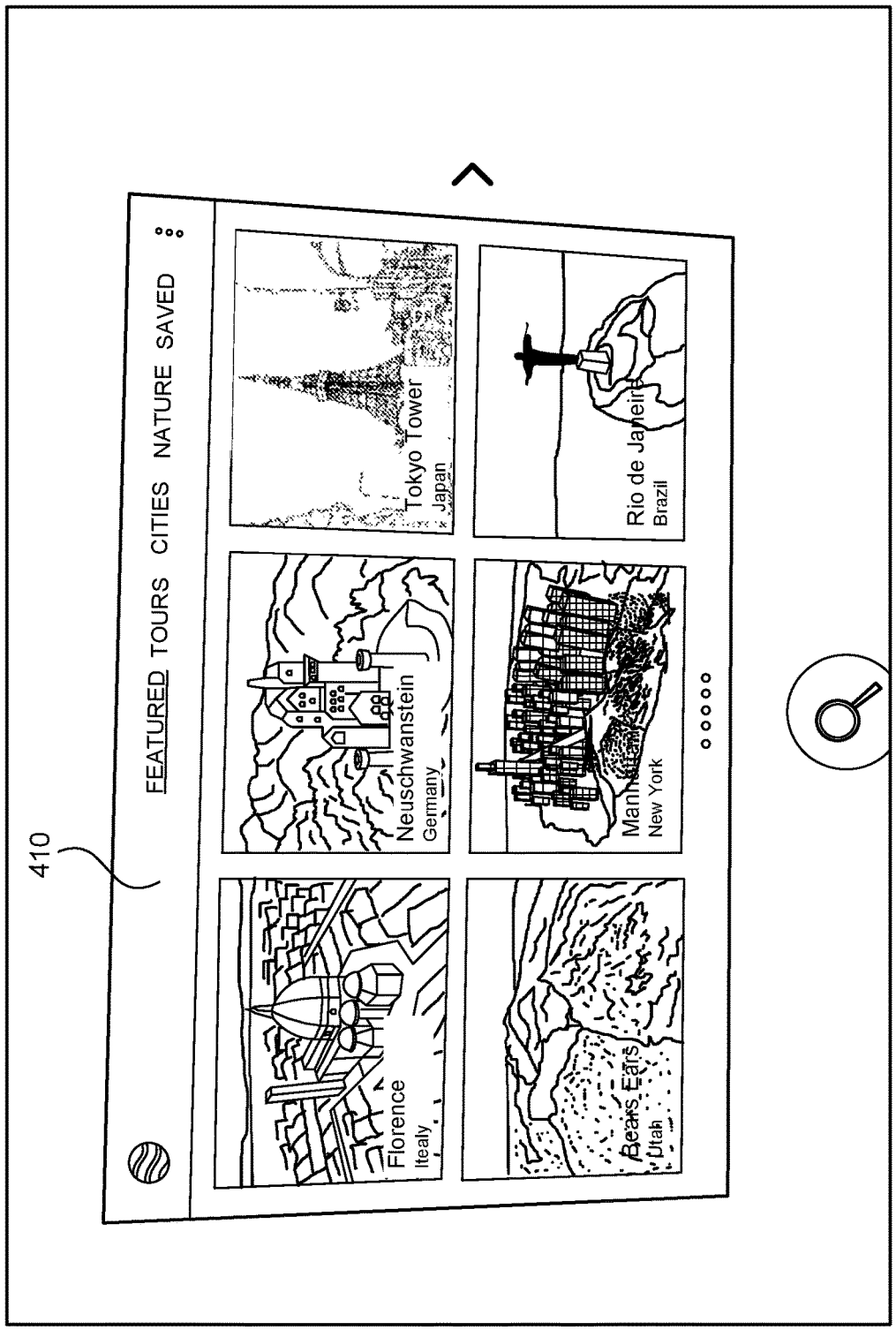
FIG. 5B illustrates a display menu viewed by a user using a second controller.

In some implementations, as shown in FIG. 5B, the user may directly move (e.g., teleport, transfer, etc.) to a desired location through a menu display 410. In this example implementation, the menu display 410 may be displayed by clicking a button (e.g., menu button) on the second controller 220 to display the menu display 410 to the user. The menu display 410 may include stored locations to be moved (e.g., teleported) to a desired location. For example, as shown in FIG. 5B, the illustrated menu display 410 may include six destinations (e.g., Florence, Italy, Neuschwanstein, Germany, Tokyo, Japan, Bears Ears, Utah, Manhattan, N.Y., and Rio de Janeiro, Brazil) to be selected. Once a location is selected, the user is directly moved (e.g., teleported) to the selected location and interacted within the second virtual object.

Figure 5C:
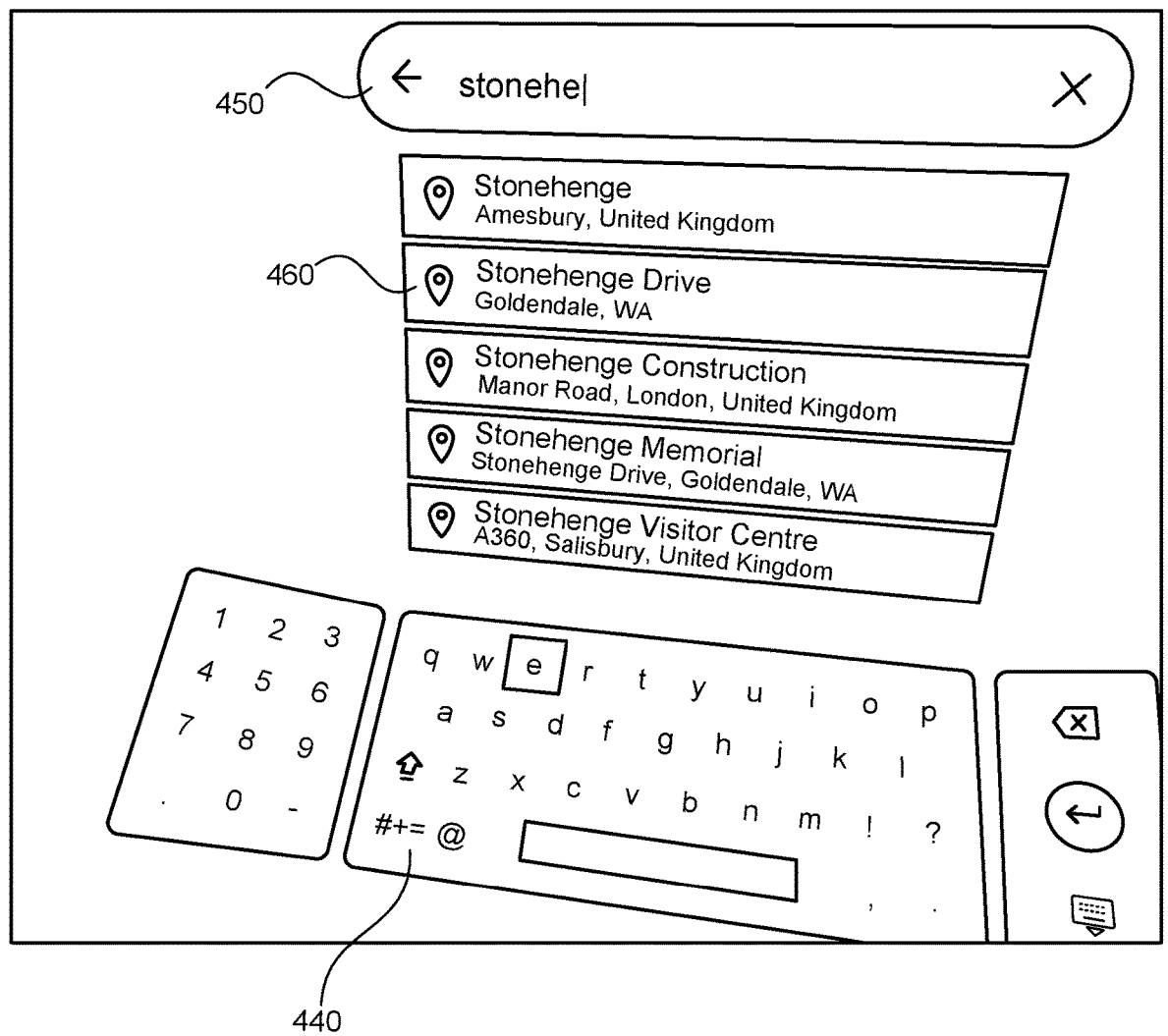
FIG. 5C illustrates a keyboard viewed by a user using a second controller.

In some implementations, as shown in FIG. 5C, if the menu display 410 does not contain the desired location to be moved, the user may bring up a keyboard 440 and type in the desired location via the second controller 220. In this example, the user is attempting to move (e.g., teleport) to Stonehenge, located in Amesbury, United Kingdom. In some implementations, the user may bring up the keyboard 440 at any time during interaction, without displaying the menu display 410, and type in the desired location in an input window 450. In other words, the user may bring up the keyboard 440 and type in the desired location during interaction with the first virtual object or during interaction with the second virtual object. For convenience, the user can type only the first few letters of the desired location in the input window 450, and generate a list of possible locations beginning with the typed letters, as illustrated in box 460.

Figure 6A:
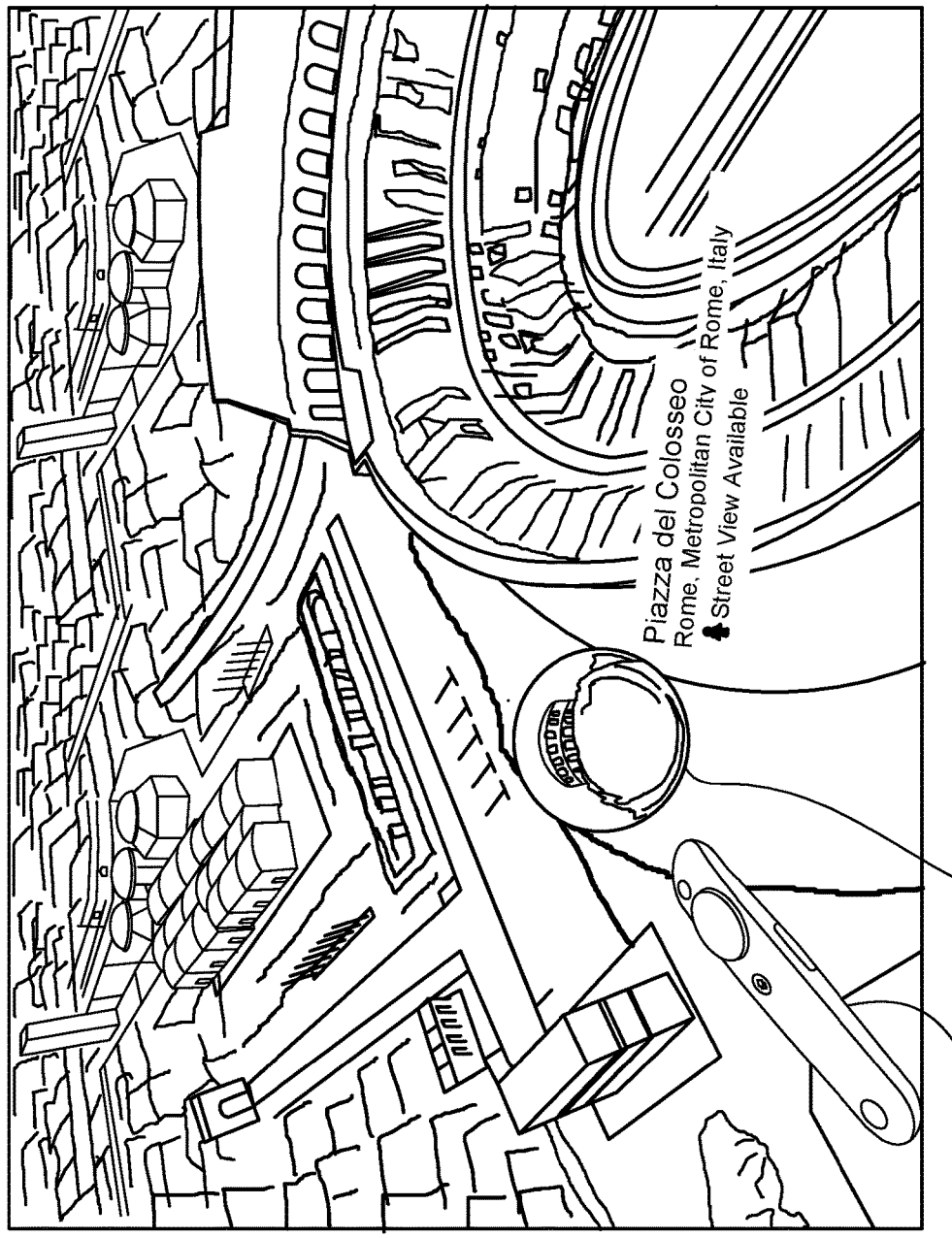
FIG. 6A illustrates a virtual environment viewed by a user using a first controller and a second controller, in accordance with another example embodiment.
Figure 6B:
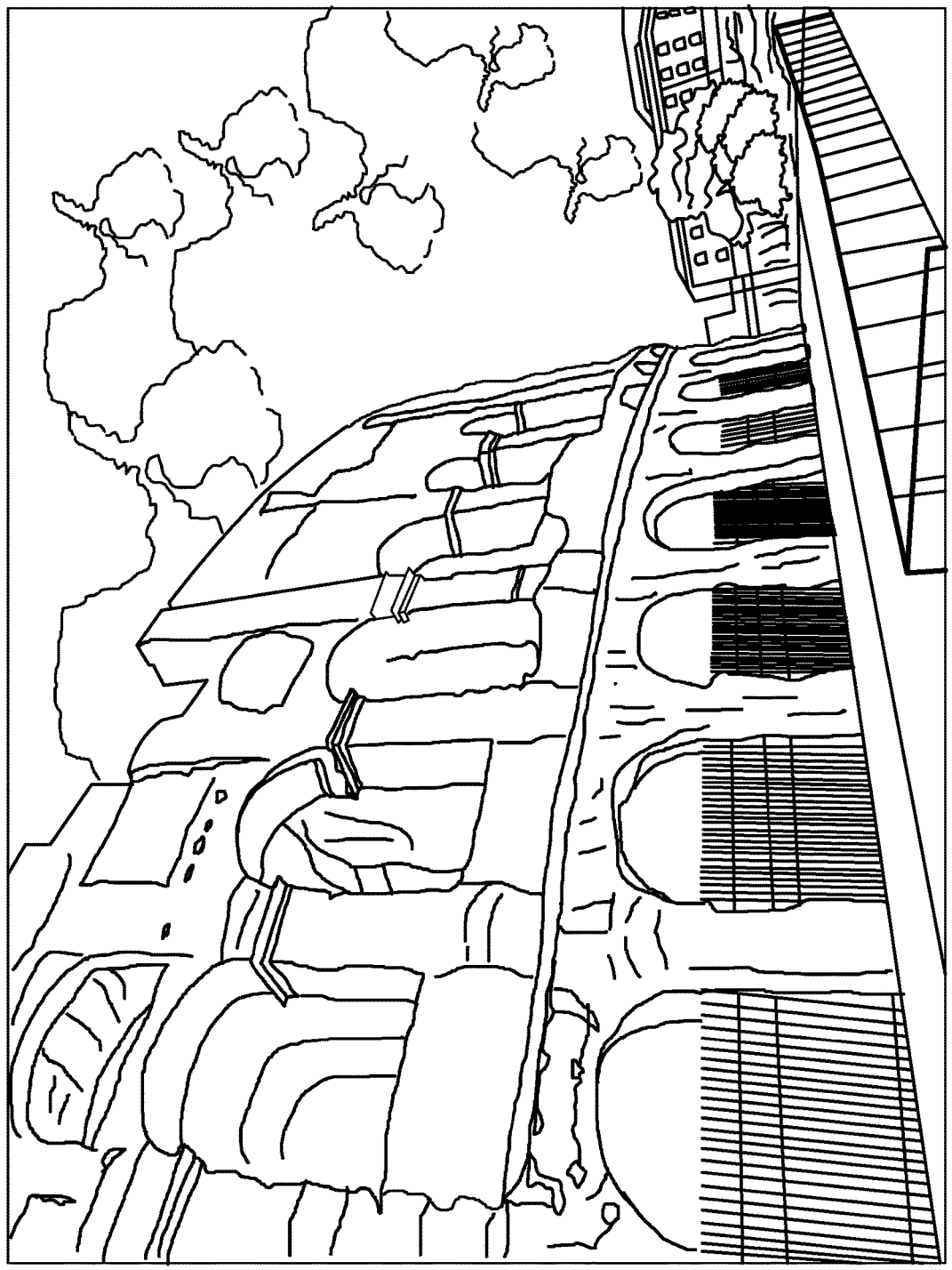
FIG. 6B illustrates a virtual environment of FIG. 6A viewed by a user moved within a second virtual object, in accordance with another example embodiment.

FIG. 6A illustrates a virtual environment viewed by a user using a first controller and a second controller, in accordance with another example embodiment. In this example, the user has a size that is relatively big compared to the world (i.e., buildings, mountain, terrain, etc. are perceived smaller). FIG. 6B illustrates a virtual environment of FIG. 6A viewed by a user interacting (e.g., immersed) within a second virtual object.

As shown in FIG. 6A, the first virtual object is an orb 601 (e.g., a panoramic image (e.g., street level view) mapped to a sphere). The orb 601 may act as a portal into a street view location and move (e.g., teleport) the user to a street view (e.g., a panoramic image (street level view) of the selected location). The orb 601 may correspond with the location above which the user is located. In this example, the user selected and is located in the city of Rome, Italy, and the orb 601 displays the location of Piazza del Colosseo (Colosseum) in Rome, Italy to be interacted with. In other words, the user may interact with the orb 601 to change between a fly over mode (as shown in FIG. 6A) and a street view mode (as shown in FIG. 6B).

In some implementations, the street view mode may be implemented by interacting with the orb 601. For example, the user may bring the controller (e.g., first controller 210) closer to the user's face and move (e.g. teleport) to the Colosseum at street view, as shown in FIG. 6B. When the user moves the controller (e.g., first controller 210) away from the user's face, the orb 601 switches back to a contracted size (the user is moved back to fly over mode) and displays the view of the orb 601 (as shown in FIG. 6A). In this method, the user can use the orb 601 to view the street level and move (e.g., teleport) to the location. In some implementations, the user may sneak a peek into the street view location and move (e.g., teleport) back with ease.

In some implementations, the user may interact with the orb 601 and select the street view by clicking on the orb 601 with the second controller 220 (not shown). This interaction will also move (e.g., teleport) the user to the street view (corresponding with the view in the orb 601) as shown in FIG. 6B. In comparison to the method of bringing the orb 601 closer to user, as described above, this method permanently teleports the user to the location. In some implementations, the user cannot exit the street view without selecting a command (e.g., clicking a button to return to FIG. 6A) and returning back to the fly over mode.

Once in the street view, the user may observe various views at street level providing an immersive experience in the virtual environment. In other words, the user observes the images in a panoramic 360° view of the stored images at street level. In some implementations, in order to move to different location(s) in street view, the user exits out of street view and moves an indicator to the desired location in FIG. 6A, and selects the street view with the new location.

In some implementations, the user can move to different locations (in street view) and observe other locations while still in street view. For example, in reference with FIG. 6B, if the user wishes to observe what's around the corner of the Colosseum (right-hand side, looking towards the Colosseum), the user moves toward the Colosseum and observes the new location. In this event, new images will be generated and displayed illustrating the new location. This creates a more immersive experience in the virtual environment without leaving the street view. In some implementations, while at the new location, the user may exit the street level view and view the new location in the fly over mode. For example, while moving around in the street view, the user may wish to observe the new location in relation to the entire city, therefore, the user may exit out of street view (via the orb 601) and determine the new location as viewed in the fly over mode.

In some implementations, the user may change views between a global view (as depicted in FIG. 2) and a street view (as depicted in FIG. 6A). In one implementation, the street view may be implemented by changing the scale of the user. For example, in the global view, the first virtual object is a globe 25 and the user may select a location by rotating the globe 25 and determine a location to visit. Once the location is selected, the user may change the scale of the user to switch to street view. One method of changing scale may be via the second controller 220 (e.g., clicking a button/trigger on the second controller) until the scale of the user exceeds a threshold. For example, the scale of the user may get smaller and smaller until the threshold has been met and the first virtual object switched into an orb. In this event, the globe 25 (as shown in FIG. 2) will switch to the orb 601 (as shown in FIG. 6A).

In some implementations, the user may directly change to street view by choosing street view with the second controller 220. For example, the second controller 220 may interact with the first virtual object (e.g., globe 25) and select street view by displaying a menu window (not shown) and switching to street view mode.

In some implementations, the various interactions described above can be defined using a variety of logical constructs. In some implementations, two main classes can be involved in handling a Location Globe, SixDofControllerUi and LocationGlobeDisplay. In some implementations, LocationGlobeDisplay determines where to render the MiniGlobeRenderable and/or two ShapeRenderable pins, by obtaining a controller transform (position and/or location) and the current GeoLocation of the user. In some implementations, SixDofControllerUi has a LocationGlobeDisplay, and updates it every update call with the controller's transform, current GeoLocation, and the user's heading. In some implementations, a new class can be added as a member of InteractiveAppMode called LocationGlobeInteractable that handles all interactions and will update the LocationGlobeDisplay when it should expand and where the laser is pointing. In some implementations, LocationGlobeInteractable can communicate with LocationGlobeDisplay. In some implementations, the GetLocationGlobeDisplay method can be added to Ui, and grab the display in InteractiveAppMode. In some implementations, by having a pointer to LocationGlobeDisplay, the need for an additional state object to be passed around can be eliminated, at the expense of making the Ui interface more complex.

In some implementations, the LocationGlobeInteractable detects beam collision with a sphere sized collider that's positioned based on the LocationGlobeDisplay's transform. In some implementations, upon laser collision, the InteractiveAppMode can update the current controller layout to enable teleportation and rotation. In some implementations, at the same time, the interactable will tell the display to expand the globe and start updating the cursor pin. In some implementations, since it's a member of InteractiveAppMode, it can stop updating when the another app mode is pushed onto the app mode stack such as MenuAppMode or during the teleportation fade to black transition, ChangeViewAppMode. In some implementations, the methods for calculating the Location Globe's transforms may not be in this class or it can stop updating positioning when the user opens the menu. In some implementations, another restriction is that since LocationGlobeInteractable keeps state information about the rotation of the globe, if InteractiveAppMode is popped off the app mode stack then this information can be lost. In some implementations, the LocationGlobeInteractable calls methods on the LocationGlobeDisplay class to shrink/expand it, update the cursor pin, and/or rotate the globe.

In some implementations, communication between LocationGlobeInteractable and LocationGlobeDisplay can be facilitated by adding a LocationGlobeState as a member of Actor. This method eliminates the dependency between LocationGlobeInteractable and LocationGlobeDisplay, and reduces clutter on the Ui interface. However, this can result in the overhead maintenance of this additional state object, which may not fit perfectly as a member of actor.

Figure 7A:
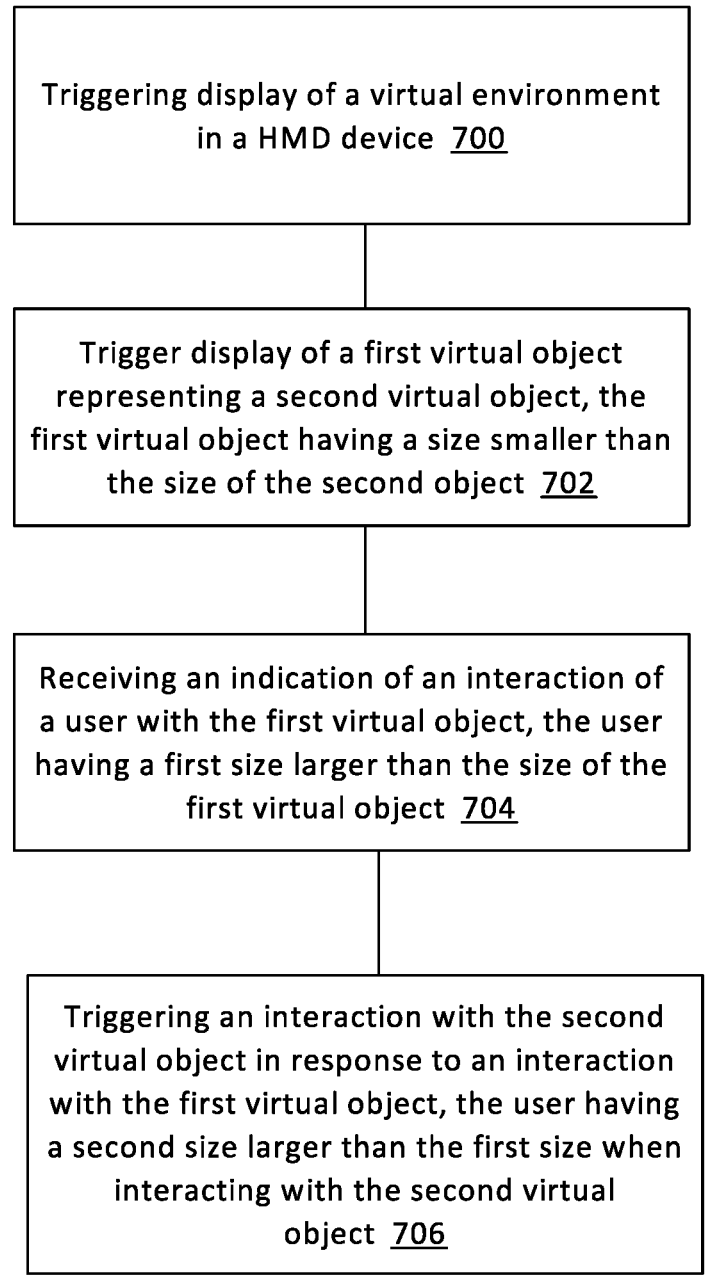
FIGS. 7A and 7B are flowcharts of method of triggering interactions in a virtual reality environment, in accordance with embodiments as described herein.
Figure 7B:
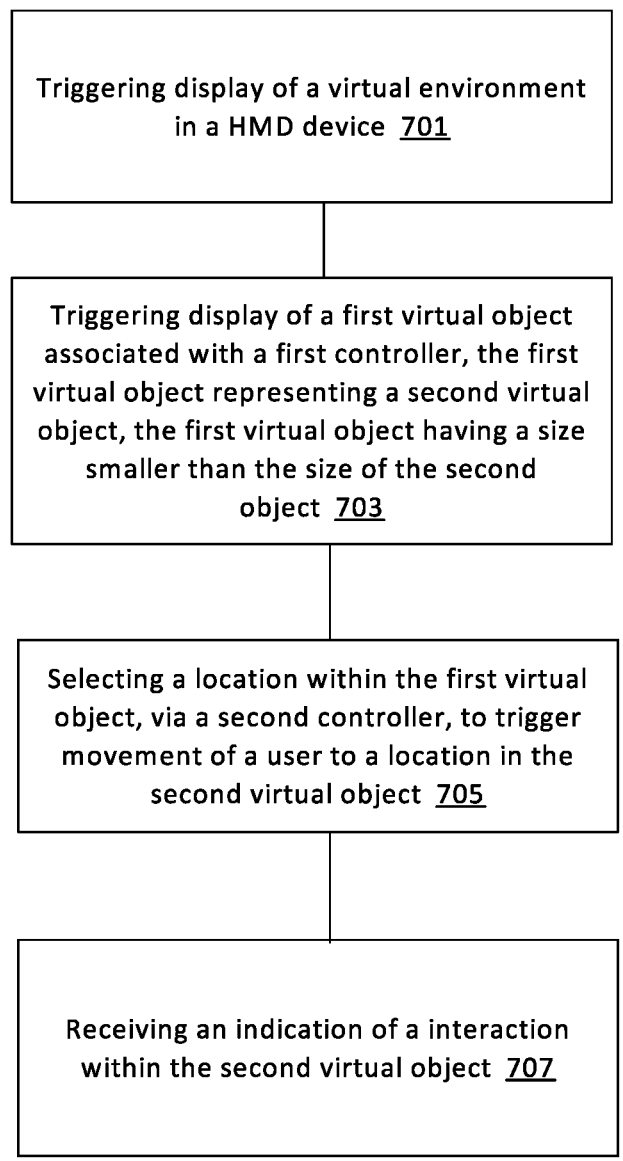

Methods of interacting with virtual objects in a virtual reality environment, in accordance with embodiments as described herein, are shown in FIGS. 7A and 7B. In block 700, systems and methods may trigger display of a virtual environment in the HMD device. Upon the triggering display of the virtual environment, the systems and methods may trigger display of a first virtual object representing a second virtual object. The first virtual object may have a size smaller than the second virtual object (block 702). When the user interacts (e.g., selects a location) with the first object, the user may have a first size that is larger than the size of the first virtual object (block 704). Then the user triggers an interaction with the second virtual object I response to the interaction with the first virtual object (block 706). During this interactions level, the user has a second size larger than the first size when interacting with the second virtual object.

Similarly, the exemplary method described in FIG. 7B may trigger display of a virtual environment in the HMD device (block 701). Upon the triggering display of the virtual environment, the systems and methods may trigger display of a first virtual object associated with a first controller. The first virtual object may represent a second virtual object. The first virtual object may have a size smaller than the second virtual object (block 703). During the interaction of the first object, the user selects a location within the first virtual object, via a second controller, to trigger movement of a user to a location in the second virtual object (block 705). At this stage, the user may receive an interaction within the second virtual object (block 707). For example, the user may be on and/or or near the surface of the second object or completely immersed inside the environment of the second virtual object.

In some implementations, as shown in FIG. 1A, the controller 102 may be operably coupled with, or paired with the HMD 100 via, for example, a wired connection, or a wireless connection such as, for example, a WiFi or Bluetooth connection. This pairing, or operable coupling, of the controller 102 and the HMD 100 may provide for communication between the controller 102 and the HMD 100 and the exchange of data between the controller 102 and the HMD 100. This may allow the controller 102 to function as a controller in communication with the HMD 100 for interacting in the immersive virtual environment generated by the HMD 100.

For example, a manipulation of the controller 102, and/or an input received on a touch surface of the controller 102, and/or or a movement of the controller 102, may be translated into a corresponding selection, or movement, or other type of interaction, in the virtual environment generated and displayed by the HMD 100.

The example implementation shown in FIG. 1A includes one controller 102 in communication with the HMD 100, for data exchange with the HMD 100, and interaction with the features, elements, objects and the like in the virtual environment generated by the HMD 100. However, in some implementations, more than one controller 102 may be operably coupled with, and in communication with, the HMD 100, and may operate together, or separately, for interaction in the virtual environment.

Figure 8A:
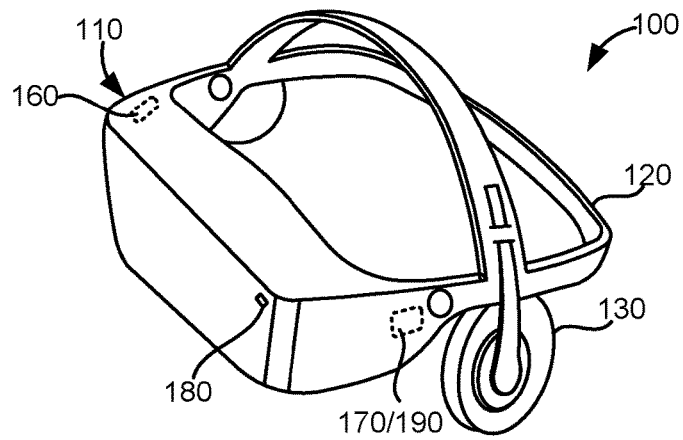
FIGS. 8A and 8B are perspective views of an example head mounted display device.
Figure 8B:
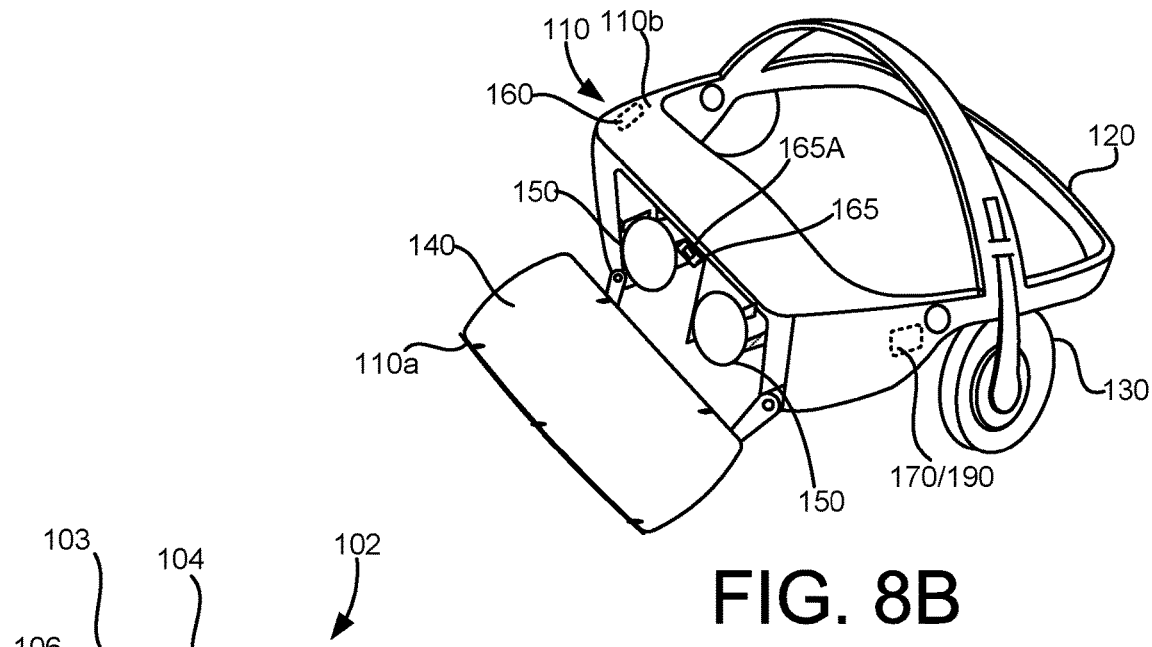
Figure 8C:
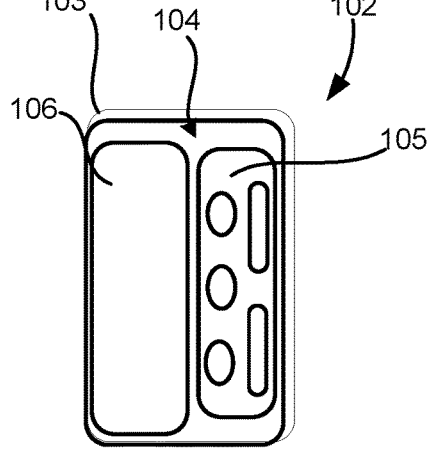
FIG. 8C illustrates an example handheld electronic device, in accordance with implementations as described herein.

FIGS. 8A and 8B are perspective views of an example HMD, such as, for example, the HMD 100 worn by the user in FIG. 1, and FIG. 8C illustrates an example controller such as, for example, the controller 102 shown in FIG. 1.

The controller 102 may include a housing 103 in which internal components of the device 102 are received, and a user interface 104 on the housing 103, accessible to the user. The user interface 104 may include, for example, a touch sensitive surface 106 configured to receive user touch inputs, touch and drag inputs, and the like. The user interface 104 may also include user manipulation devices 105 such as, for example, actuation triggers, buttons, knobs, toggle switches, joysticks and the like.

The HMD 100 may include a housing 110 coupled to a frame 120, with an audio output device 130 including, for example, speakers mounted in headphones, also coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100.

For example, in some implementations, the sensing system 160 may include an inertial measurement unit (IMU) 162 including various different types of sensors such as, for example, an accelerometer, a gyroscope, a magnetometer, and other such sensors. A position and orientation of the HMD 100 may be detected and tracked based on data provided by the sensors included in the IMU 162. The detected position and orientation of the HMD 100 may allow the system to in turn, detect and track the user's head gaze direction and movement.

In some implementations, the HMD 100 may include a gaze tracking device 165 including, for example, one or more sensors 165A, to detect and track eye gaze direction and movement. Images captured by the sensor(s) 165A may be processed to detect and track direction and movement of the user's eye gaze, and the detected and tracked eye gaze may be processed as a user input to be translated into a corresponding interaction in the immersive virtual experience. A camera 180 may capture still and/or moving images that may be used to help track a physical position of the user and/or other external devices in communication with/operably coupled with the HMD 100. The captured images may also be displayed to the user on the display 140 in a pass through mode.

Figure 9:
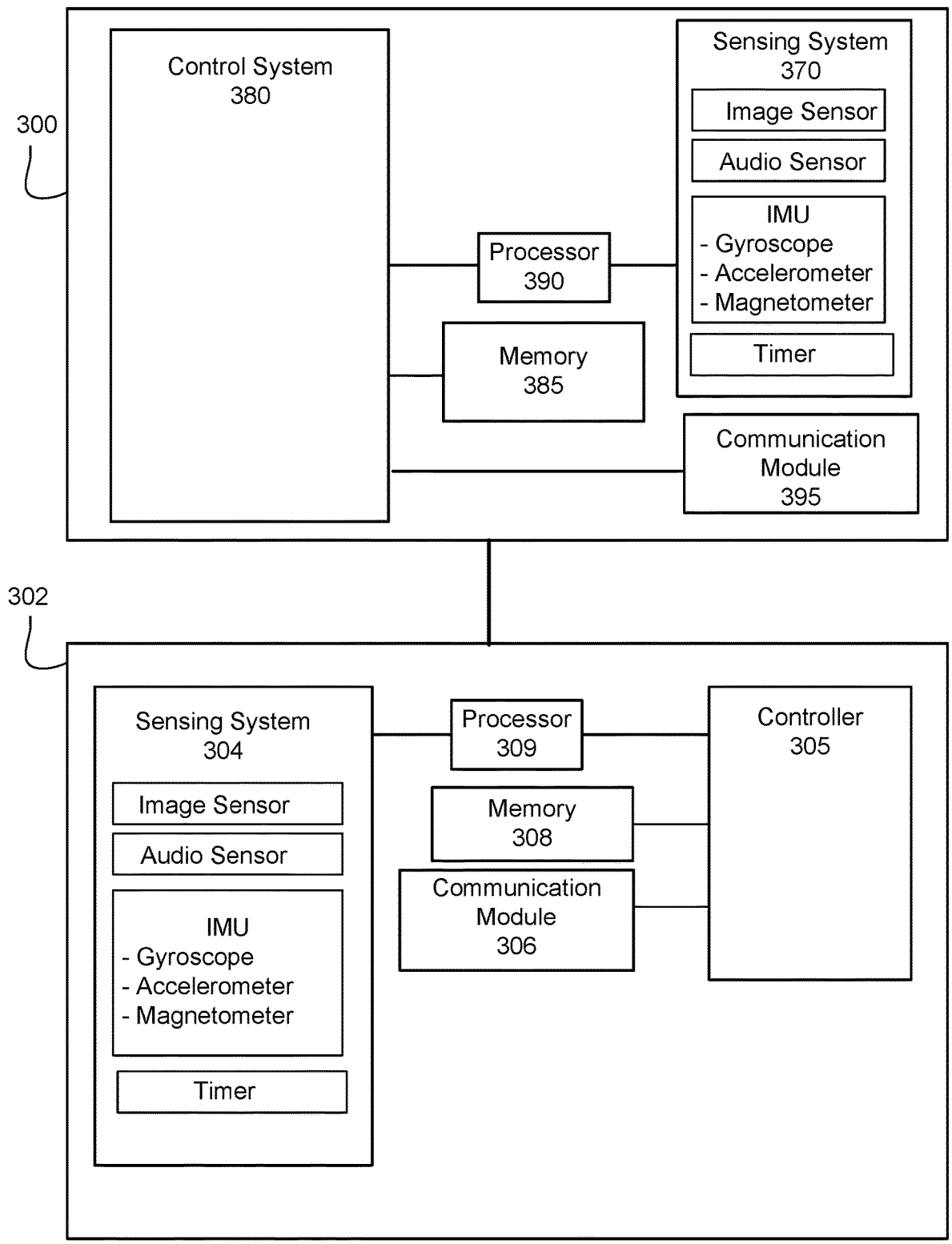
FIG. 9 is a block diagram of an example augmented and/or virtual reality system, in accordance with implementations as described herein.

A block diagram of a system providing for moving the virtual elements of the virtual environment relative to the user is shown in FIG. 9. The system may include a first electronic device 300 (such as, for example, an HMD as described above with respect to FIGS. 1 and 8A-8B), and at least one second electronic device 302 (such as, for example, a controller as described above with respect to FIGS. 1 and 8C) in communication with the first electronic device 300.

The first electronic device 300 may include a sensing system 360 and a control system 370, which may be similar to the sensing system 160 and the control system 170, respectively, shown in FIGS. 8A and 8B. The sensing system 360 may include different types of sensors, including, for example, a light sensor, an audio sensor, an image sensor, a distance and/or proximity sensor, an IMU including, for example, a gyroscope, an accelerometer, a magnetometer and the like, a timer, and/or other sensors and/or different combination(s) of sensors. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 8A and 8B. The first electronic device 300 may also include a memory 380, and a processor 390 in communication with the sensing system 360 and the control system 370. The processor 390 may process inputs received from the sensing system 360, as well as from other external sources such as, for example, the second electronic device 302, and execute instructions corresponding to the detected inputs. The first electronic device 300 may also include a communication module 350 providing for communication between the first electronic device 300 and other, external computing devices, such as, for example, the second electronic device 302 and other computing devices involved in handling system related information.

The second electronic device 302 may include a communication module 306 providing for communication and data exchange between the second electronic device 302 and another device, such as, for example, the first electronic device 300. In some implementations, depending on a particular configuration of the second electronic device 302 (i.e., a controller, versus a keyboard or a mouse), the second electronic device 302 may include a sensing system 304 including, for example, an image sensor and an audio sensor, such as is included in, for example, a camera and microphone, an IMU, a timer, a touch sensor such as is included in a touch sensitive surface of a controller, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

Figure 10:
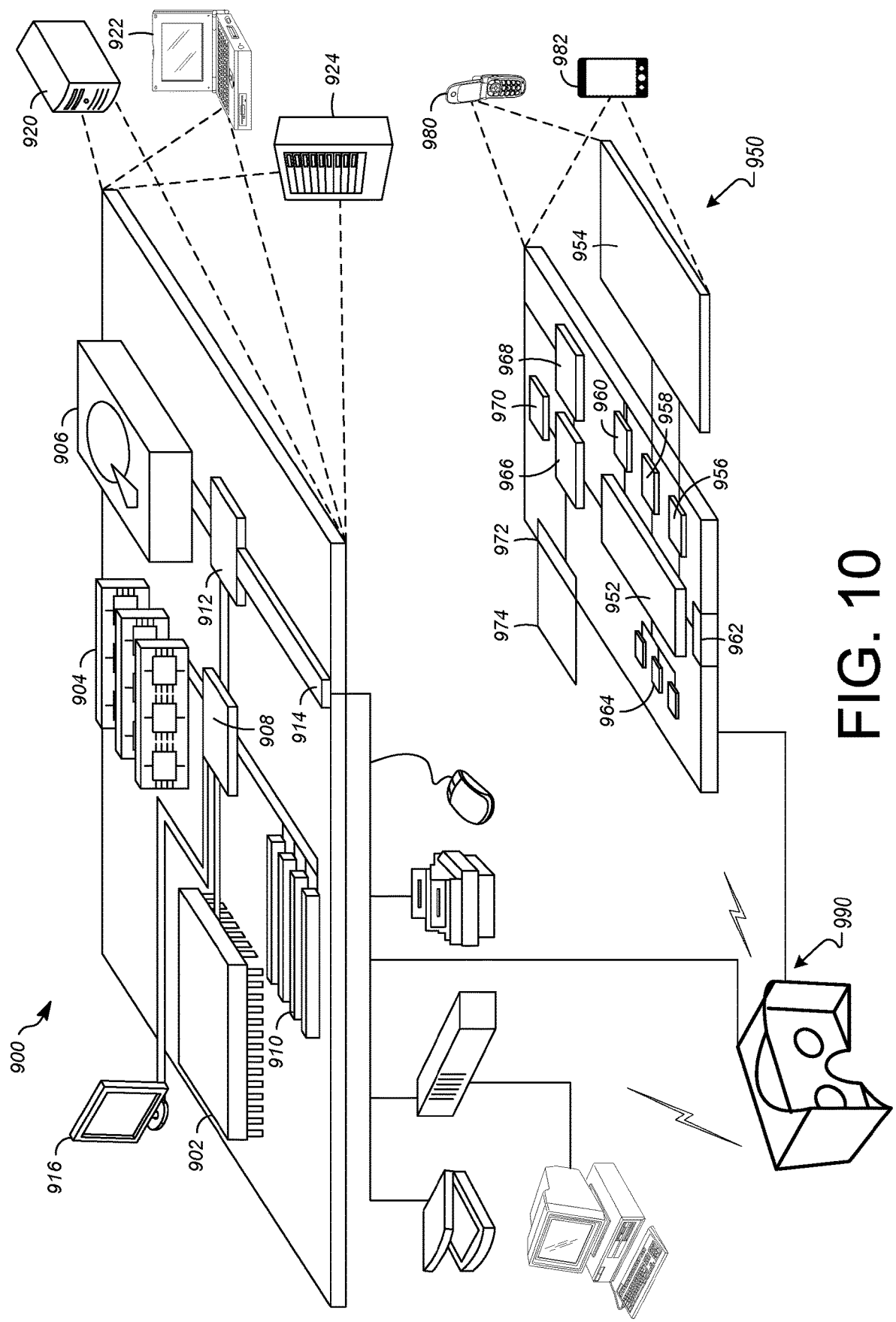
FIG. 10 shows an example of a computer device and a mobile computer device that can be used to implement the techniques described herein.

FIG. 10 shows an example of a computer device 900 and a mobile computer device 950, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset/HMD device 990). For example, one or more sensors included on a computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the VR space that can then be used as input to the VR space. For example, the computing device 950 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some implementations, a touchscreen of the computing device 950 can be rendered as a touchpad in VR space. A user can interact with the touchscreen of the computing device 950. The interactions are rendered, in VR headset 990 for example, as movements on the rendered touchpad in the VR space. The rendered movements can control virtual objects in the VR space.

In some implementations, one or more output devices included on the computing device 950 can provide output and/or feedback to a user of the VR headset 990 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. In the example of the laser pointer in a VR space, the computing device 950 appears as a virtual laser pointer in the computer-generated, 3D environment. As the user manipulates the computing device 950, the user in the VR space sees movement of the laser pointer. The user receives feedback from interactions with the computing device 950 in the VR environment on the computing device 950 or on the VR headset 990.

In some implementations, a computing device 950 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Further implementations are summarized in the following examples:

Example 1

A method comprising: triggering display of a virtual environment in a head mounted display (HMD) device operating in a physical environment, triggering display of a first virtual object representing a second virtual object, the first virtual object having a size smaller than a size of the second virtual object, receiving an indication of an interaction of a user with the first virtual object, the user having a first size larger than the size of the first virtual object, and triggering an interaction with the second virtual object in response to an interaction with the first virtual object, the user having a second size larger than the first size when interacting with the second virtual object.

Example 2

The method of claim 1, wherein the interaction with the first virtual object includes selecting a location within the first virtual object.

Example 3

The method of claim 1 or 2, wherein the interaction with the second virtual object includes moving, in response to the interaction with the first virtual object, within the second virtual object to a location within the second virtual object corresponding with the location within the first virtual object.

Example 4

The method of claims 1 to 3, wherein the moving includes teleporting in the second virtual object that corresponds to the location within the first virtual object.

Example 5

The method of claim 1 or 2, wherein the first virtual object is a mini-globe of Earth Example 6

The method of claim 1 or 2, wherein the first virtual object is an orb including a street level view of the location.

Example 7

The method of claim 6, wherein the first virtual object is changed to the orb when a size of the user becomes smaller prior to receiving the indication of interaction of the user with the first virtual object.

Example 8

The method of claim 1, wherein the interaction with the first object is translated directly into corresponding interaction with the second object.

Example 9

The method of claim 1, wherein the interaction with the first object is translated into corresponding interaction with the second object at a later time.

Example 10

The method of claim 1, wherein the interaction with the first object includes a first level of interaction that is later followed with a second level of interaction with the second virtual object.

Example 11

The method of claims 1 to 10, wherein the second level of interaction is closer to ground level relative to the first level of interaction.

Example 12

The method of claim 1, wherein the second virtual object is identical to the second virtual object.

Example 13

A method, comprising: triggering display of a virtual environment in a head mounted display (HMD) device operating in a physical environment, triggering display of a first virtual object associated with a first controller, the first virtual object being a representation of a second virtual object, the first virtual object having a size smaller than a size of the second virtual object, selecting a location within the first virtual object, via a second controller, to trigger movement of a user to a location in the second virtual object, and receiving an indication of a interaction within the second virtual object.

Example 14

The method of claim 13, wherein the first virtual object is configured to be fixed at a distance proximate to a portion of the first controller.

Example 15

The method of claim 13 or 14, wherein the first virtual object is configured to move in response to a movement of the first controller.

Example 16

The method of claims 13 to 15, wherein the first virtual object is configured to change state in response to selecting the location using the second controller.

Example 17

The method of claims 13 to 16, wherein a size of the first virtual object is expanded, when responding to selecting the location.

Example 18

The method of claims 13 to 16, wherein a size of the first virtual object is contracted, when no location is selected.

Example 19

An apparatus comprising: a head mounted display (HMD) device, a first controller and a second controller, and a processor programmed to: trigger display of a virtual environment in a head mounted display (HMD) device operating in a physical environment, trigger display of a first virtual object associated with a first controller, the first virtual object being a representation of a second virtual object, the first virtual object having a size smaller than a size of the second virtual object, select a location within the first virtual object, via a second controller, to trigger movement of a user to a location in the second virtual object, and receive an indication of a interaction within the second virtual object.

Example 20

The system of claim 19, wherein the first virtual object is configured to change state in response to selecting the location using the second controller A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method, comprising:
   triggering display of a virtual environment in a head mounted display (HMD) device operating in a physical environment;
   triggering display of a first virtual object within the virtual environment, the first virtual object representing a second virtual object within the virtual environment, the first virtual object having a size smaller than a size of the second virtual object; and
   receiving an indication of a first level of interaction of a user being represented within the virtual environment with the first virtual object, the user having a first size larger than the size of the first virtual object, the first level of interaction representing a general location within the first virtual object;
   receiving an indication of a second level of interaction of the user with the first virtual object, the second level of interaction being a specific location within the first virtual object; and
   triggering an interaction with the second virtual object in response to the second level of interaction with the first virtual object, the user being represented within the virtual environment having a second size larger or smaller than the first size when interacting with the second virtual object to change a view, wherein:
   when the second size of the user is larger than the first size of the user, the view is further from ground level of a location within the second virtual object; and
   when the second size of the user is smaller than the first size of the user, the view is closer to ground level of a location within the second virtual object.

2. The method of claim 1, wherein the first level of interaction with the first virtual object includes selecting a location within the first virtual object.

3. The method of claim 2, wherein the interaction with the second virtual object includes moving, in response to the second level of interaction with the first virtual object, within the second virtual object to a location within the second virtual object corresponding with the location within the first virtual object.

4. The method of claim 3, wherein the moving includes teleporting in the second virtual object that corresponds to the location within the first virtual object.

5. The method of claim 2, wherein the first virtual object is a mini-globe of Earth.

6. The method of claim 2, wherein the first virtual object is an orb including a street level view of the location.

7. The method of claim 6, wherein the first virtual object is changed to the orb when a size of the user becomes smaller prior to receiving the indication of interaction of the user with the first virtual object.

8. The method of claim 1, wherein the second level of interaction with the first virtual object is directly translated into corresponding interaction with the second virtual object.

9. The method of claim 1, wherein the second level of interaction with the first virtual object is translated into corresponding interaction with the second virtual object at a later time.

10. The method of claim 1, wherein the user in the second level of interaction is smaller than the user in the first level of interaction.

11. The method of claim 1, wherein the first virtual object is identical to the second virtual object, albeit scaled in size.

12. The method of claim 1, further comprising a first virtual controller to trigger displaying the first virtual object and a second virtual controller to trigger the interaction with the first virtual object.

13. The method of claim 12, wherein the triggered interaction by the second virtual controller is a light indicator that intersects the first virtual object.

14. A method, comprising:
   triggering display of a virtual environment in a head mounted display (HMD) device operating in a physical environment;
   triggering display of a first virtual object within the virtual environment, the first virtual object being associated with a first controller and being a representation of a second virtual object, the first virtual object having a size smaller than a size of the second virtual object within the virtual environment, the displayed first virtual object being configured to be fixed at a distance proximate to a portion of the first controller that is displayed in the virtual environment;
   selecting a location within the first virtual object, via a second controller, to trigger movement of a user being represented within the virtual environment to a location in the second virtual object, the user having a first size larger than the size of the first virtual object;
   changing a view in response to the selection of the location within the first virtual object, the user having a second size larger or smaller than the first size when interacting with the second virtual object, wherein:
   when the second size of the user is larger than the first size of the user, the view is further from ground level within the second virtual object; and
   when the second size of the user is smaller than the first size of the user, the view is closer to ground level within the second virtual object; and
   receiving an indication of an interaction within the second virtual object.

15. The method of claim 14, wherein the first virtual object is configured to move in response to a movement of the first controller.

16. The method of claim 14, wherein the first virtual object is configured to change state in response to selecting the location using the second controller.

17. The method of claim 16, wherein a size of the first virtual object is expanded, when responding to selecting the location.

18. The method of claim 16, wherein a size of the first virtual object is contracted, when no location is selected.

19. A system comprising:
   a head mounted display (HMD) device;
   a first controller and a second controller; and
   a processor programmed to:
   trigger display of a virtual environment in the HMD device operating in a physical environment;

trigger display of a first virtual object within the virtual environment, the first virtual object being associated with the first controller being a representation of a second virtual object, the first virtual object having a size smaller than a size of the second virtual object;

select a location within the first virtual object, via the second controller, to trigger movement of a user being represented within the virtual environment to a location in the second virtual object, the user having a first size larger than the size of the first virtual object, the second controller being configured to be displayed in the virtual environment while selecting the location within the first virtual object;

change a view in response to the selection of the location within the first virtual object, the user having a second size larger or smaller than the first size when interacting with the second virtual object, wherein:

when the second size of the user is larger than the first size of the user, the view is further from ground level within the second virtual object; and when the second size of the user is smaller than the first size of the user, the view is closer to ground level within the second virtual object; and receive an indication of an interaction within the second virtual object.

20. The system of claim 19, wherein the first virtual object is configured to change state in response to selecting the location using the second controller.

21. A method, comprising:

triggering display of a virtual environment in a head mounted display (HMD) device operating in a physical environment;

triggering display of a first virtual object within the virtual environment, the first virtual object representing a second virtual object viewable within the virtual environment, the first virtual object having a size smaller than a size of the second virtual object;

receiving an indication of an interaction of a first level of a user being represented within the virtual environment with the first virtual object, the user having a first size larger than the size of the first virtual object, the first level of interaction representing a general location within the first virtual object;

receiving an indication of a second level of interaction of the user with the first virtual object, the second level of interaction being a specific location within the first virtual object; and triggering an interaction with the second virtual object in response to the second level of interaction with the first virtual object, the user being represented within the virtual environment having a second size larger or smaller than the first size when interacting with the second virtual object; and changing a scale of the user represented within the virtual environment to change a view, wherein when the scale of the user is made smaller until a threshold is met, the view is changed from a view further from ground level of a location within the second virtual object to a view closer to ground level of the location within the second virtual object.

* * * * *